United States Patent
Kando et al.

[11] Patent Number: 5,481,515
[45] Date of Patent: Jan. 2, 1996

[54] OPTICAL INFORMATION STORAGE MEDIUM CONTROL APPARATUS

[75] Inventors: Hidehiko Kando, Matsudo; Mamoru Kainuma, Ibaraki; Masaru Muranishi, Ibaraki; Katsuhiko Kimura, Ibaraki, all of Japan

[73] Assignee: Hitachi, Ltd., Tokyo, Japan

[21] Appl. No.: 156,440

[22] Filed: Nov. 23, 1993

Related U.S. Application Data

[63] Continuation-in-part of Ser. No. 69,511, Jun. 1, 1993, Pat. No. 5,404,009.

[30] Foreign Application Priority Data

Jun. 2, 1992 [JP] Japan .................................. 4-141311
Nov. 25, 1992 [JP] Japan .................................. 4-314937
Jan. 19, 1993 [JP] Japan .................................. 5-006636

[51] Int. Cl.⁶ .................................................. G11B 7/135
[52] U.S. Cl. ............................ 369/44.12; 369/44.11; 369/109; 369/110; 369/112
[58] Field of Search ........................ 369/44.11, 44.12, 369/44.14, 44.23, 44.41, 103, 109, 110, 112

[56] References Cited

U.S. PATENT DOCUMENTS 5,005,162  4/1991  Mitsumori et al. ................... 369/44.12
5,164,930  11/1992 Sugiura ................................. 369/44.12

FOREIGN PATENT DOCUMENTS 4-60931  2/1992  Japan .
4-89634  3/1992  Japan .
4-89636  3/1992  Japan .

OTHER PUBLICATIONS

Optical Memory Symposium, (Jul. 13, 1992), Fundamental operation of a novel integrated magnetoptical signal detection device Tami Kihara et al., pp. 53–54.

Blazed Holographic Optical Pick-up Heads, Y. Komma et al. Matsushita Electric Industrial Co. Ltd. pp. 107–108 (Jul. 15, 1992).

Compact Optical Head Integrated with Chip elements for CD-ROM Drives, Tuyoshi Nagano et al., Opto-Electronics Research Labs. NEC Corporation, pp. 113–114. (Jul. 15, 1992).

Primary Examiner—Georgia Y. Epps
Assistant Examiner—Muhammad N. Edun
Attorney, Agent, or Firm—Antonelli, Terry, Stout & Kraus

[57] ABSTRACT

An optical pickup device includes a laser source for emitting linearly polarized light; an objective lens for focusing source light received from the laser source on an optical information storage medium; a photodetector for receiving signal light reflected from the medium for converting the signal light into an electric signal. The photodetector includes at least a photosensor, a planar optical waveguide formed on the photosensor for propagating the signal light therethrough, diffraction grating for diffracting the signal light propagating through the waveguide, and an incidence coupler provided on the waveguide for reflecting the source light emitted from the laser source and receiving signal light obtained through the objective lens from the medium. A plane of incidence including a normal to a surface of the incidence coupler and the optical axis of the source light is formed at an angle range of 5 to 85 degrees to a plane of polarization of the source light having an electric field vector of the optical axis and the source light. Thus, the direction of polarization of the signal light from the medium is also formed at an angle range of 5 to 85 degrees to the plane of incidence for the signal light to thereby detect the presence/absence of information. This reduces the size of the pickup device.

27 Claims, 19 Drawing Sheets

XIV — XIV

OPTICAL INFORMATION STORAGE MEDIUM CONTROL APPARATUS

CROSS-REFERENCE TO RELATED APPLICATION

The present application is a continuation-in-part of U.S. application Ser. No. 08/069,511 filed on Jun. 1, 1993, now U.S. Pat. No. 5,404,009 entitled "Optical Information Processing Apparatus" by Hideo KANDO, et al. and assigned to the present assignee, the contents of which are incorporated herein by reference.

BACKGROUND OF THE INVENTION

The present invention relates to optical information storage medium control apparatus for magneto-optic disks and optical disks, and more particularly to optical information storage medium control apparatus with a miniaturized optical pickup device.

Technique for the optical pickup device is disclosed in JP-A-4-89634. In this technique, the pickup device includes a lamination of a phase film layer, a polarization film layer, an optical diffraction unit and a waveguide. In optical access, light is sent through the phase film layer to an optical disk and its reflection is returned to the phase film layer. The phase film layer produces a difference in phase between the light in the access and the reflection, and sends the reflection to the polarization film layer to polarize the reflection. The polarized light is then guided through the optical diffraction unit to the waveguide. Another reference is Tuyoshi Nagano et al., Nippon Denki Corporation, Compact Optical Head Integrated with Chip Elements for CD-ROM Drives", Optical Memory Symposium, 92, pp.113–114. This technique is concerned with an integrated circuit of a hologram device, a laser diode and a photodiode with a pattern of the hologram device being divided into four equal sectors.

SUMMARY OF THE INVENTION

It is an object of the present invention to provide an optical information storage medium control apparatus which includes an optical pickup device having improved sensitivity of detection of signal light.

It is another object of the present invention to provide an optical information storage medium control apparatus which includes a thin small pickup device.

According to one aspect of the present invention, there is provided an optical information storage medium control apparatus includes: an optical information storage medium; a storage medium driver provided on a frame for driving the medium; an optical pickup device including a laser source for emitting linearly polarized source light, an objective lens for focusing the source light emitted from the laser source on the medium, a photodetector receiving signal light reflected from the medium, for converting the signal light into an electric signal, the photodetector including at least a photosensor, a planar optical waveguide formed on the photosensor, for propagating the signal light therethrough, a diffraction grating for diffracting the signal light propagating through the waveguide, and an incidence coupler provided on the waveguide, for reflecting the source light from the laser source and receiving the signal light obtained through said objective lens from the medium, wherein an incidence plane including a normal to a surface of the incidence coupler and an optical axis of the source light being formed at an angle range of 5 to 85 degrees to a plane of polarization of the source light having an electric field vector of the optical axis and the source light; an optical pickup driver for moving the optical pickup device so as to move the source light focused on the medium through the objective lens in a direction transverse to tracks of the medium; and a controller for controlling respective operations of the storage medium driver, optical pickup driver, and pickup device.

The photodetector includes, on the photosensor a first planar optical waveguide for propagating therethrough a waveguided light having a TE (Transverse Electric) mode obtained by diffracting the signal light with the diffraction grating and a second planar optical waveguide for propagating therethrough a waveguided light having a TM (Transverse Magnetic) mode obtained by diffracting the signal light with the diffraction grating. The photodetector includes a buffer layer smaller in refractive index than the first and second planar optical waveguides between the photosensor and the first and second planar optical waveguides. The photodetector also includes a first diffraction grating corresponding to the first planar optical waveguide for diffracting the source light from the laser source, and a second diffraction grating corresponding to the second planar optical waveguide for diffracting the source light from the laser source, and a guided light absorbing layer for causing the source light from the laser source and entering the first and second planar optical waveguides to diffract and escape.

The optical pickup device includes a reflective mirror disposed between the incidence coupler of the photodetector and the objective lens in the optical paths of the source light and the signal light. The optical pickup device includes a reflective mirror disposed between the incidence coupler of the photodetector and the objective lens in the optical paths of the source light and the signal light, and a collimating lens disposed in the optical path between the objective lens and the reflective mirror. The optical pickup device includes the photodetector arranged on substantially the same plane with the objective lens in a housing. The optical pickup device includes: in an inner housing, a laser source for emitting linearly polarized light, an objective lens for focusing the source light emitted from the laser source onto the medium, and a photodetector receiving the signal light reflected from the medium, for converting the signal light into an electric signal; an outer housing including the inner housing having the laser source, objective lens and photodetector; and a magnetoelectric coil fixed to the inner housing and a magnetic circuit member fixed to the outer housing cooperating to support the inner housing such that an electric current supplied to the magnetoelectric coil forms a magnetic circuit to thereby move the optical pickup device disposed within the inner housing away from and toward the medium and in a direction transverse to tracks of the medium. The optical pickup device includes a housing in which an objective lens focuses the source light emitted from the laser source on the medium, the objective lens is fixed into a magnetoelectric coil supported by a suspension member connected to an inner side of the housing whereby the magnetoelectric coil by supplying an electric current moves the objective lens away from and toward the medium and in a direction transverse to tracks of the medium, and a biasing coil for generating a magnetic field in irradiating the source light on the medium is disposed on a position extended from the housing and opposited to the objective lens through the medium. The pickup device includes a sleeve enclosing the laser source and the photodetector disposed within the housing, the sleeve being covered with a transparent member transparent to the source light and the signal light in an airtight manner. The laser source and the photodetector of the optical pickup device are disposed on an attaching base within an inner housing, the laser source includes a semiconductor laser bonded in a recess formed by anisotropic etching in a part of a single crystal substrate, the photodetector is formed tilted such that the source light emitted from the semiconductor laser is radiated on the semiconductor single crystal substrate, a bonding pad is formed in a recess on the crystal substrate and connected electrically to said photodetector, the bottom surface of the recess is parallel to a surface of the attaching base, terminals are disposed on the attaching base for feeding a signal to the semiconductor laser and receiving a signal extracted from the photodetector, and the terminals have upper end surfaces parallel to a surface of the bonding pad. The bonding pad includes a thin film lead formed on the semiconductor single crystal substrate.

The photodetector includes a plurality of photodetectors connected with each other in a longitudinal direction, each photodetector includes, on a photosensor, a first diffraction grating corresponding to the first planar optical waveguide, for diffracting the source light emitted from the laser source and a second diffraction grating corresponding to the second planar optical waveguide, for diffracting the source light emitted from the laser source, and a guided light absorbing layer for dodging the source light entered to the first and second planar optical waveguides.

The laser source and the plurality of photodetectors of the optical pickup device are disposed on an attaching base within a housing; the laser source includes a semiconductor laser bonded in a recess formed by anisotropic etching in a part of a single crystal substrate; the plurality of photodetectors are formed tilted on the semiconductor single crystal substrate so as to receive the source light emitted from the semiconductor laser; bonding pads are formed in a recess said semiconductor single crystal state and connected electrically on the semiconductor single crystal substrate such that signals from the plurality of photodetectors are united; the bottom surface of the recess is parallel to a surface of the attaching base; and a plurality of terminals are disposed on the attaching base for feeding a signal to the semiconductor laser and receiving signals extracted from said photodetectors, said terminals have at least upper end surfaces parallel to surfaces of the bonding pads.

A biasing coil is disposed on a position extending from the frame opposited to the medium through the objective lens.

The optical pickup device includes a cap provided on a vertical wall of the frame and including said laser source, a photodetector for reflecting the source light emitted from the laser source and for receiving the signal light reflected from the medium and converting the signal light into an electric signal, a first reflective mirror for reflecting the source light and the signal light, and a collimating lens disposed in an opening in the cap and facing to an opening of the vertical wall of the frame; a transparent member transparent to the source light and signal light and disposed on a housing opposited to the collimating lens; a second reflective mirror disposed within the housing, for reflecting the source light and the signal light; and an objective lens disposed on the housing so as to focus the source light onto the medium and to receive the signal light from the medium.

The optical pickup driver includes an electromagnetic coil fixed into the optical pickup device, and a magnetic circuit member fixed to the frame so as to form a magnetic circuit by supplying an electric current to the electromagnetic coil. The optical pickup driver includes an electric motor, a worm gear provided on a rotating shaft of the motor, and a rack-pinion mechanism coupled from the worm gear to the optical pickup device.

The biasing coil includes a biasing magnet, and a changeover coil for selectively switching the angle of the biasing magnet so as to generate a magnetic field in an optimal state on that portion of the medium which receives the source light. The biasing coil includes a plurality of biasing coils, one of which is selectively operated so as to generate a magnetic field in an optimal state on that portion of the medium which receives the source light.

The apparatus further includes means for removably attaching the medium to the storage medium driver.

The medium includes a magneto-optic disk and an optical disk.

By the structure of the optical information storage medium control apparatus as described above, the incidence plane including the normal to the surface of the incidence coupler and the optical axis of the source light is formed at an angle range of 5 to 85 degrees to a plane of polarization of the source light having an electric field vector of the optical axis and the source light. Thus, the direction of polarization of the signal light from the optical information storage medium is also formed at 5 to 85 degrees to the plane of incidence of the signal light, so that the presence/absence of information is detected. Thus, the polarized light is separated efficiently to thereby improve the sensitivity of detection of the signal light. By the setting of that angle range, a miniaturized optical pickup device is achieved.

Since the incidence coupler includes the diffraction grating, the intra- and extra-incidence plane components of the signal light are introduced independently into the waveguides depending on the spacing of the diffraction grating.

Since the plurality of optical waveguides have diffraction gratings for TE (Transverse Electric) and TM (Transverse Magnetic) modes, the intra- and extra-incidence plane components of the signal light are detected independently. The reliability of detection of the signal light is improved with a signal indicative of a difference between those intra- and extra-incidence plane components of the signal light.

Since the reflective mirror is disposed in the optical path extending from the incidence coupler of the photodetector to the objective lens, part of the optical path extending from the incidence coupler to the objective lens is formed so as to extend laterally of the optical pickup device and not in the direction of an increase in the thickness of the optical pickup device. Hence, the optical pickup device reduced in thickness is realized even if the optical path is long.

Since the photodetector, the objective lens and the collimating lens are disposed in substantially the same plane, an optical path is formed which has a sufficient length extending laterally of the optical pickup device to thereby realize an optical pickup device reduced in thickness and improve the reliability of detection of the signal light.

DESCRIPTION OF THE PREFERRED EMBODIMENTS

Embodiments of the present invention will be described below with respect to the drawings.

Figure 1:
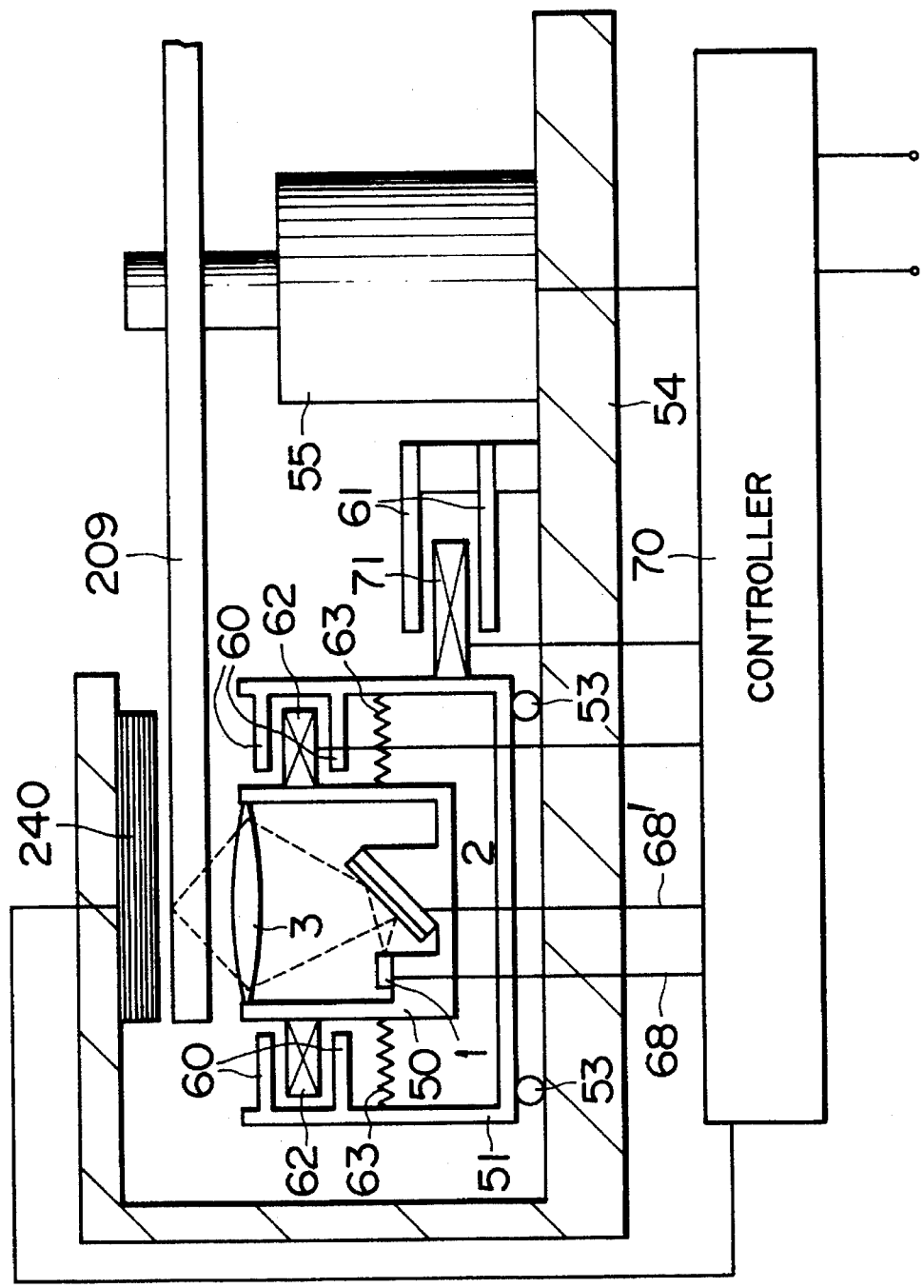
FIG. 1 is a schematic of an optical information storage medium control apparatus as a first embodiment of the present invention.

FIG. 1 shows the structure of an essential portion of an optical information storage control apparatus (hereinafter referred to only as an optical disk device) as a first embodiment of the present invention. The optical disk device of FIG. 1 includes a C-like cross-sectional unit base 54, a rotating motor 55 fixed to a lower portion of the unit base 54 for rotating an magneto-optic disk 209 which is a magneto-optic storage medium around a shaft parallel to a vertical portion of the C-like unit base 54, an outer housing 51 disposed movably though a nearly moving mechanism 53 on the lower portion of the unit base 54, an inner housing 50 supported by suspension members 63 within the outer housing 51, a semiconductor laser 1 disposed within the inner housing 50, an integrated photodetector 2 disposed at a position within the inner housing 50 irradiated with a source light from the laser 1, an objective lens 3 disposed in an optical path of an irradiated light reflected from the integrated photodetector 2 and fixed to the inner housing 50, a pair of spaced flange-like magnetic circuit members 60 extending along the inner periphery of the outer housing 51, a finely movable electromagnetic coil 62 disposed between the spaced magnetic circuit members 60 of the pair and fixed to the outer periphery of the inner housing 50, a pair of spaced magnetic circuit members 61 fixed at a position adjacent to the outer housing 51 to the lower portion of the unit base 54, a coarsely moving electromagnetic coil 71 disposed between the spaced magnetic circuit members 61 of the pair and fixed to the outer periphery of the outer housing 51, a biasing coil 240 attached to a lower surface of an upper portion of the unit base 54 (at a position on the opposite side of a magneto-optic disk 209 from the objective lens 3), and a system controller 70 connected through elastic leads to the rotating motor 55, finely and coarsely electromagnetic coils 62, 71, integrated photodetector 2, semiconductor laser 1, and biasing coil 240.

The housing 50, the semiconductor laser 1 which is a laser source and received within the housing 50, the integrated photodetector 2 and the objective lens 3 constitute an optical pickup device.

The housing 50 is moved normal to a recording surface of the magneto-optic disk 209 and radially of the disk 209 depending on the adjustment of the magnitude of an electric current supplied to the electromagnetic coil 62. The outer housing 51 is moved radially of the disk 3 depending on adjustment of an electric current supplied to the coarsely moving electromagnetic coil 71.

The semiconductor 1 emits linearly polarized light, the plane of polarization of which is formed at an angle range of 5 to 85 degrees to a plane defined by a normal of a plane of an incidence coupler of the integrated photodetector 2 and an optical axis of the source light. The angle range of 5 to 85 degrees referred to will be described in more detail later.

Figure 2:
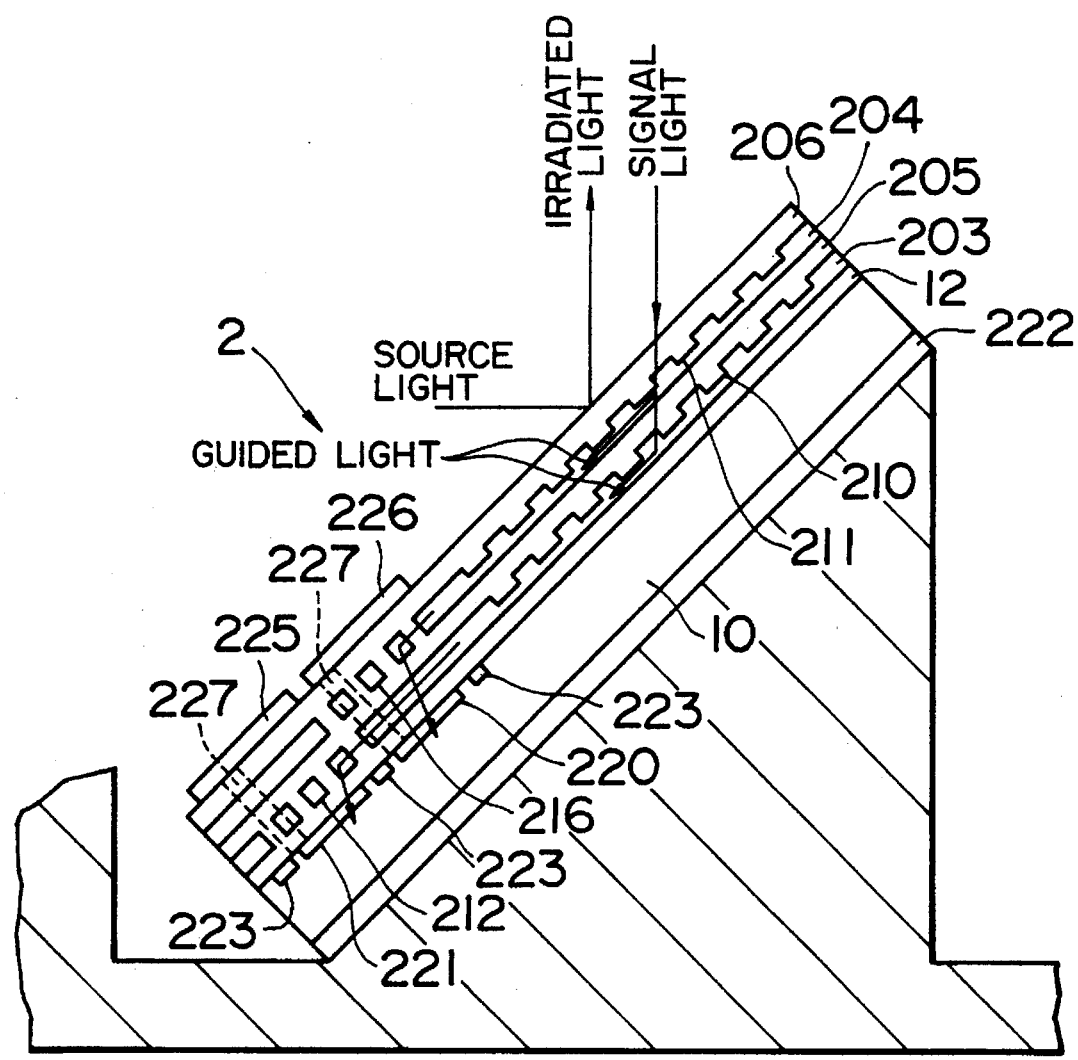
FIG. 2 is a cross-sectional view of one example of an integrated photodetector.

The cross section of the photodetector 2 is selected so as to extend along the optical axis of the guided light, as shown in FIG. 2. The guided light points to light propagating through the optical waveguide of the photodetector 2.

The integrated photodetector 2 includes a semiconductor substrate 10; a buffer layer 12, a lower planar optical waveguide 203, an intermediate layer 205, an upper planar optical waveguide 204 and a protective layer 206 formed sequentially on the light incidence side of the semiconductor substrate 10; and an N-layer 222 ( that portion of the semiconductor substrate 10 where high density N-type impurities are implanted). A lower planar optical waveguide 203 has a lower incidence diffraction grating 210 and a lower outgoing diffraction grating 215 formed therein. An upper planar optical waveguide 204 has an upper incidence diffraction grating 211 and an upper outgoing diffraction grating 216 formed therein. P-layers 220 and 221 (those portions of the semiconductor substrate 10 where high-density P-type impurities are implanted) are formed at positions in the semiconductor substrate 10 adjacent to the buffer layer 12 and corresponding to the positions of the formed upper and lower outgoing diffraction grating 216 and 215, respectively. The P-type layers 220 and 221 each is surrounded with an N-type channel stopper 223 and prevented from superimposition to avoid electrical coupling.

Electrodes 225, 226 are formed on the protective layer 206. Contact holes 227 are formed through all the buffer layer 12, lower planar optical waveguide 203, intermediate layer 205, upper planar optical waveguide 204, and protective layer 206. The electrodes 226 and 225 are electrically connected to the P-layers 221 and 220, respectively, through the corresponding contact holes 227.

The buffer layer 12, lower planar optical waveguide 203, intermediate layer 205, upper planar optical waveguide 204, and protective layer 206 each are made of a material having a small imaginary part of a complex number indicative of the refractive index of the material (a material which absorbs a small quantity of light). The real part of a complex number indicative of the refractive index of the material of the lower planar optical waveguide 203 is selected so as to be larger than the real parts of complex numbers indicative of the refractive indexes of the materials of the buffer layer 12 and intermediate layer 205. The real part of a complex number indicative of the refractive index of the material of the upper planar optical waveguide 204 is selected so as to be larger than those of complex numbers indicative of the refractive indexes of the materials of the protective layer 206 and intermediate layer 205. The incidence coupler receives the source light from the semiconductor laser 1 and reflects it, and also and receives a signal light reflected from the magneto-optic disk 209.

In the apparatus of FIG. 1, the source light from the semiconductor laser 1 fixed to the housing 50 and driven through the flexible lead 68 by the system controller 70, is irradiated on the integrated photodetector 2. The reflection from the photodetector 2 (hereinafter referred to as an irradiated light) passes through the objective lens 3 fixed to the housing 50 to be irradiated on the magneto-optic disk 209. A reflection from the disk 209 (hereinafter referred to as a signal light) again passes back through the objective lens 3 to be irradiated on the photodetector 2.

The signal light is diffracted by the upper and lower incidence diffraction gratings 211 and 210 of the photodetector 2 and the respective diffracted rays of light are converted to guided rays of light, which propagate through the upper and lower optical waveguides 204 and 203. In this case, the coupling conditions of the guided rays of light determined by the incidence angles of the signal rays of light to the upper and lower planar optical waveguides 204 and 203, the thicknesses and refractive indexes of the upper and lower planar optical waveguides 204 and 203, the grating pitches and depths of the upper and lower incidence diffraction gratings 211 and 210, the refractive indexes of other materials, the oscillating wavelengths of the semiconductor laser, etc., are adapted to be adjusted such that the signal light excites guided light having a TE (Transverse Electric) mode in the upper planar optical waveguide 204 and guided light having a TM (Transverse Magnetic) mode in the lower planar optical waveguide 203. Alternatively, the coupling conditions may be such that the signal light excites guided light having a TM mode in the upper planar optical waveguide 204 and guided light having a TE mode in the lower planar optical waveguide 203.

The guided light which propagates through the upper planar optical waveguide 204 exits the upper outgoing diffraction grating 216 and enters the photosensor having a PIN structure composed of a P-layer (an area of the semiconductor substrate 10 where high-density impurities are implanted) 220, a thin N-type or intrinsic semiconductor substrate 10 (of relatively small impurity density) 10, and an N-layer (an area of the substrate where high-density N-type impurities are implanted) 222. The light is converted by the photosensor to an electric current as an output signal and thus the intensity of the guided light propagating through the upper planar optical waveguide 204 is detected.

The guided light which propagates through the lower planar optical waveguide 203 exits the lower outgoing diffraction grating 215 and enters the photosensor having a PIN structure composed of the P-type layer 221, semiconductor substrate 10, and N-layer 222. The light is converted by the photosensor into an electric current as an output signal and thus the intensity of the guided light propagating through the lower planar optical waveguide 203 is detected.

While in the embodiment the photosensor in the semiconductor substrate is illustrated as a PIN type as viewed from the side of the waveguide, the operation is completely unchanged even if it is an NIP type as viewed from the side of the waveguide or even if the semiconductor substrate itself is of the type of high density impurities such as a PN or NP type.

Formed on the protective layer 206 is a pair of electrodes 225, 226 which are connected electrically to the P-layers 221 and 220, respectively. Thus, when reverse biases are applied across the electrode 225 and the N-layer 222 and across the electrode 226 and the N-layer 222 electrode, electric currents generated in the PIN structure are extracted to the outside and the intensity of the guided rays of light propagating through the respective upper and lower planar optical waveguides 204 and 203 are detected independently.

Since the plane of polarization of the source light emitted from the semiconductor laser 1 is formed at an angle range of 5 to 85 degrees to the plane of the integrated photodetector 2 which the source light enters, comparison between the intensity of the currents output from the electrodes 225 and 226 allows the direction of polarization of the signal light to be monitored. Thus, the information written in the disk 209 is readable.

Figure 3:
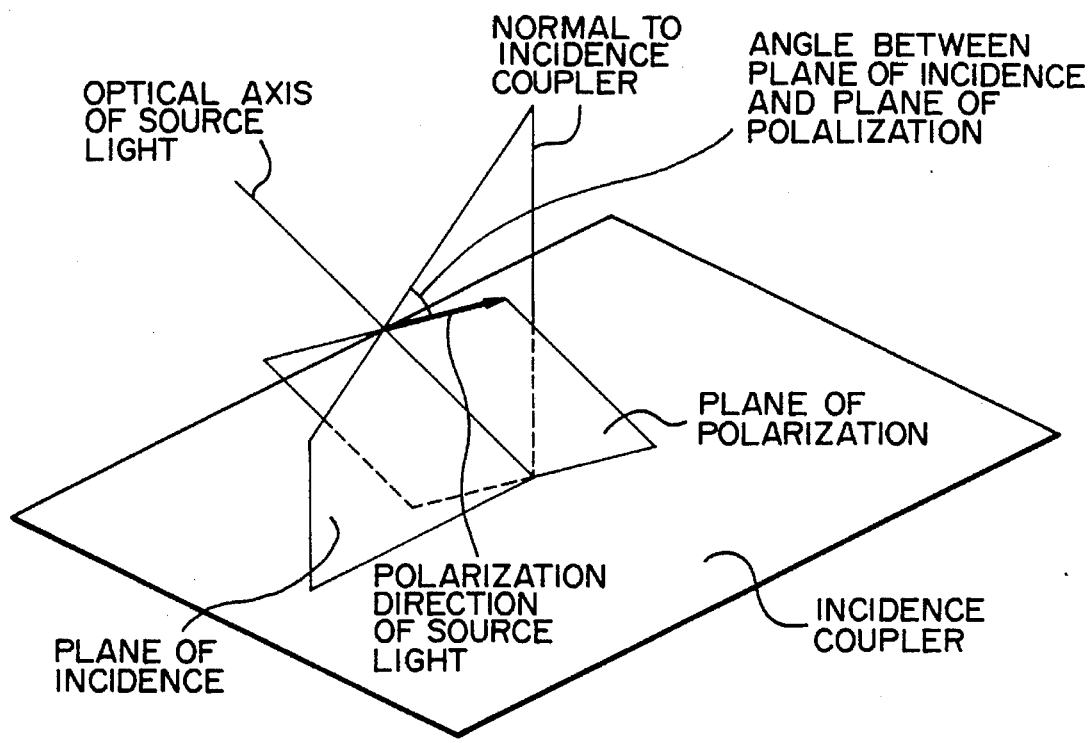
FIG. 3 illustrates the angle between a plane of incidence and a plane of polarization in the incidence coupler.

FIG. 3 illustrates that the plane of polarization of the source light in the incidence coupler of the photodetector 2 is formed at an angle of 5 to 85 degrees to the incident plane of the source light. By so forming the angle of the plane of polarization of the source light to the incident plane of the incidence coupler, the presence/absence of information in the disk is detected when the range of the angle of the direction of polarization of the signal light from the disk to the incidence plane is 5 to 85 degrees. Thus, the realized optical pickup device has a simple structure.

Figure 4:
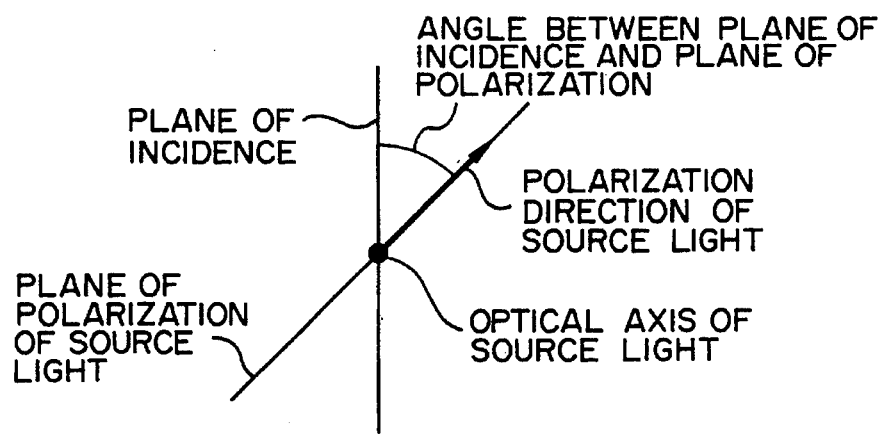
FIG. 4 illustrates an incidence coupler viewed in the direction of extension of the optical axis of the source light.

FIG. 4 is an illustrative view of FIG. 3 viewed from the direction of extension of the optical axis of the source light.

While the embodiment using the plurality of planar optical waveguides has been described, information written in the disk 209 is similarly readable by detecting only the intensity of signal of a single planar waveguide provided in place of the plurality of planar waveguides if the plane of polarization of the source light is formed at an angle range of 5 to 85 degrees to the plane of incidence of the photodetector 2. In this case, the sensitivity of reading the information is not high compared to that obtained when the plurality of planar optical waveguides is used, but the structure is simple.

The integrated photodetector 2 also outputs another signal to be described in more detail later in addition to the signal already described. Those signals are supplied through the flexible leads 68' (FIG. 1) to the system controller 70, where those signals are processed to provide a read signal and a servo signal from the disk 209.

The housing 50 is supported by suspension members 63 and is movable in a direction normal to a recording surface of the disk 209 and radially of the disk.

The system controller 70 supplies an electric current to the finely movable magnetoelectric coils 62 in the magnetic circuit members 60 in accordance with a focusing error signal obtained in the system controller 70 to move the housing 50 in the direction normal to the surface of the disk 209 to thereby perform the focus control.

In response to the detected track error signal and an information access request received from an external device through an I/O bus, the system controller 70 supplies an electric current to the coarsely moving electromagnetic coil 71 in the magnetic circuit members 61 to move the external housing 51 mounted on the linearly moving mechanism 53 radially of the disk 209. The system controller 70 also supplies an electronic current to the finely moving electromagnetic coil 62 in the magnetic circuit members 60 to move the housing 50 radially of the disk 209. As just described above, by moving the housings 51 and 50, track control of the disk 209 is provided.

The system controller 70 causes the rotating motor 55 to the disk 209.

The system controller 70 sends the read signals thus obtained to the external device (not shown) through the I/O bus (not shown).

In response to a write signal from the external device input through the I/O bus to the system controller 70, the system controller 70 modulates a drive current to the semiconductor laser 1 to change the intensity of the source light from the laser 1. The system controller 70 also supplies an electric current to a biasing coil 240 attached to the unit base 54 to apply a magnetic field to that portion of the disk 209 irradiated with the laser light to thereby write information. Erasure of information is effected in a similar process.

In order to perform the above operations, the system controller 70 is supplied with power from any external power supply (not shown).

A supplementary description of FIG. 1 will be made with respect to FIG. 5 which is a perspective view of the integrated photodetector 2 extracted from FIG. 1 and illustrates a method of processing the signals (mentioned above) from the photodetector 2.

Figure 5:
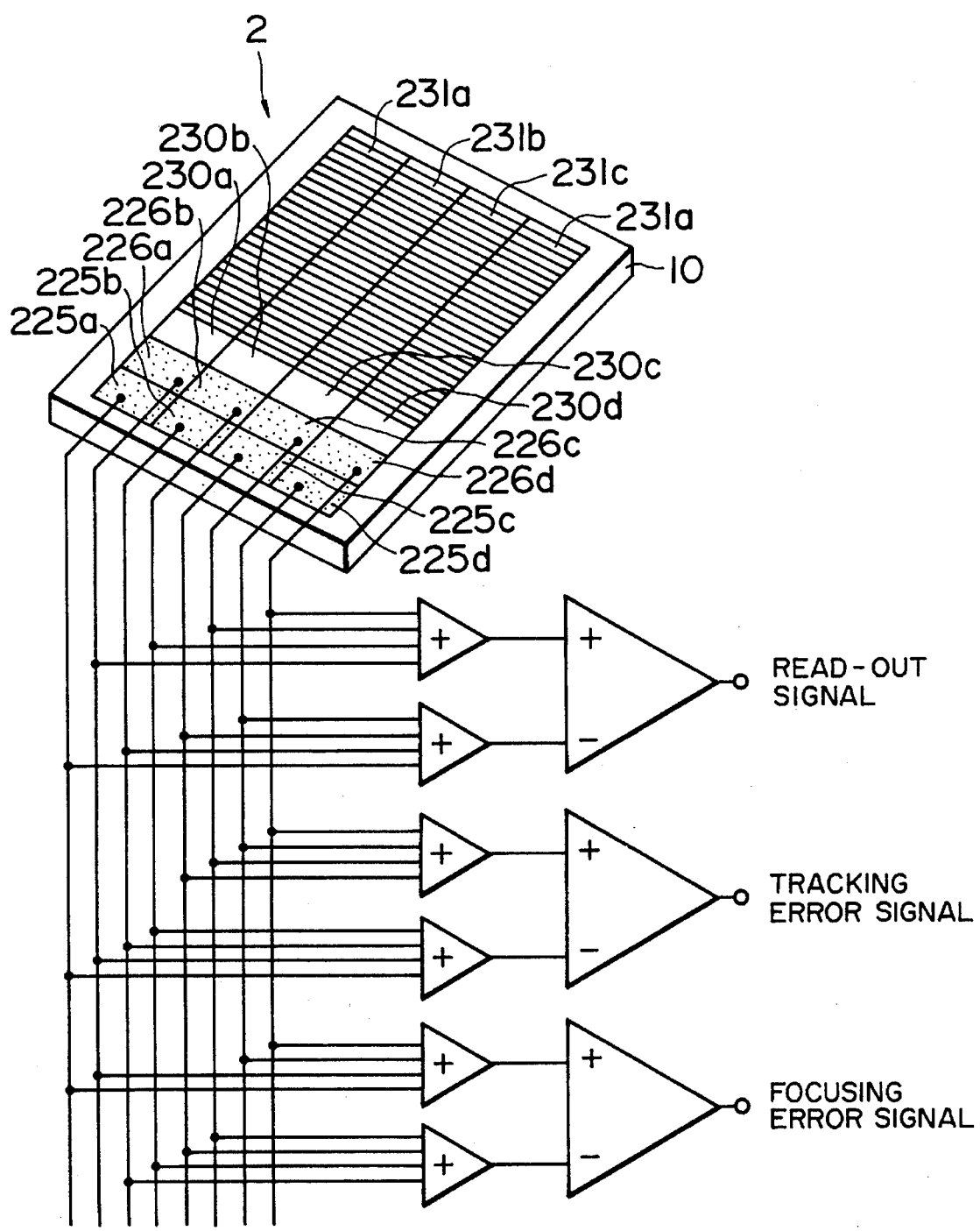
FIG. 5 illustrates an integrated photodetector and detection signals.

In FIG. 5, planar optical waveguides 230a–230d, each of which is composed of the upper and lower planar optical waveguides 204 and 203 (FIG. 2), are provided on the semiconductor substrate 10. The planar optical waveguides 230a–230d have incidence diffraction gratings 231a–231d, respectively, formed thereon. The incidence diffraction gratings 231a–231d each is composed of an upper and a lower incidence diffraction grating 211 and 210, as shown in FIG. 2. The planar optical waveguides 230a–230d have electrodes 226a–226d and 225a–225d formed thereon and corresponding to the electrodes 226 and 225, respectively, as shown in FIG. 2. Outgoing diffraction gratings corresponding to the outgoing diffraction gratings 216 and 215 of FIG. 2 and P-layers corresponding to the P-layers 220 and 221 of FIG. 2 are formed below the electrodes 226a–226d and 225a–225d.

The semiconductor substrate 10 is positioned such that the optical axis of the signal light is in the dividing line between the waveguides 230b and 230c. The signal light is irradiated on the waveguides 230a–230d.

As described above with respect to FIGS. 1 and 2, the signal light beam enters the incidence diffraction grating 231a, where it becomes guided light. The guided light propagates substantially along the dividing lines between the waveguides 230a–230d, so that the electrodes 226a and 225a outputs rays of light having different intensity of polarization. Similarly, when the signal light enters the incidence diffraction grating 231b, the electrodes 226b and 225b output polarization components having corresponding intensity. Similarly, when the signal light enters the incidence diffraction grating 231c, the electrodes 226c and 225c output polarization components having corresponding intensity. Similarly, when the signal light enters the incidence diffraction grating 231d, the electrodes 226d and 225d output polarization components having corresponding intensity.

The read signal, tracking signal, and focusing signal are obtained by the signal processing circuit of FIG. 5.

In order to divide the planar optical waveguide into the waveguides 230a–230d, the use of the waveguides having shapes such that no guided light excited in the respective waveguides mix with each other, for example, by provision of guided light absorbing layers along the respective dividing lines between the waveguides 230a–230d, or by division of the guided light along the dividing lines, is conceivable. Another method is to determine the respective curved shapes of the incidence diffraction gratings such that most of the guided rays of light propagating through the waveguides enter the corresponding photodetectors in place of provision of clear dividing lines between the waveguides 230a–230d.

While FIG. 5 show the use of the four planar optical waveguides 230a–230d, use of the three planar optical waveguides 230a–230c may fulfill an equal function to that fulfilled by the former. The process of signal detection in this case is as follows. The following numerals accompanied by characters are the respective reference numerals and characters of the electrodes and also representing the respective intensity of electric currents flowing through the electrodes. In this case, the optical axis of the signal light is assumed to be at substantially the center of the planar optical waveguide 230b. The following numerals with characters designate the electrodes representing current magnitude generated from the respective electrodes. Thus, the read signal, tracking error signal, and focusing error signal are calculated as follows:

The read signal= 226a+226b+226c−225a −225b−225c

The tracking signal=226a+225a−226c−225c

The focusing signal=226a+225a+226c+225c −226b−225b

This simplifies a pattern on the semiconductor substrate 10 to facilitate the formation of the integrated photodetector 2. In the case of using the four divided planar optical waveguides, an increased sensitivity of detection of the tracking signal is obtained.

Figure 6:
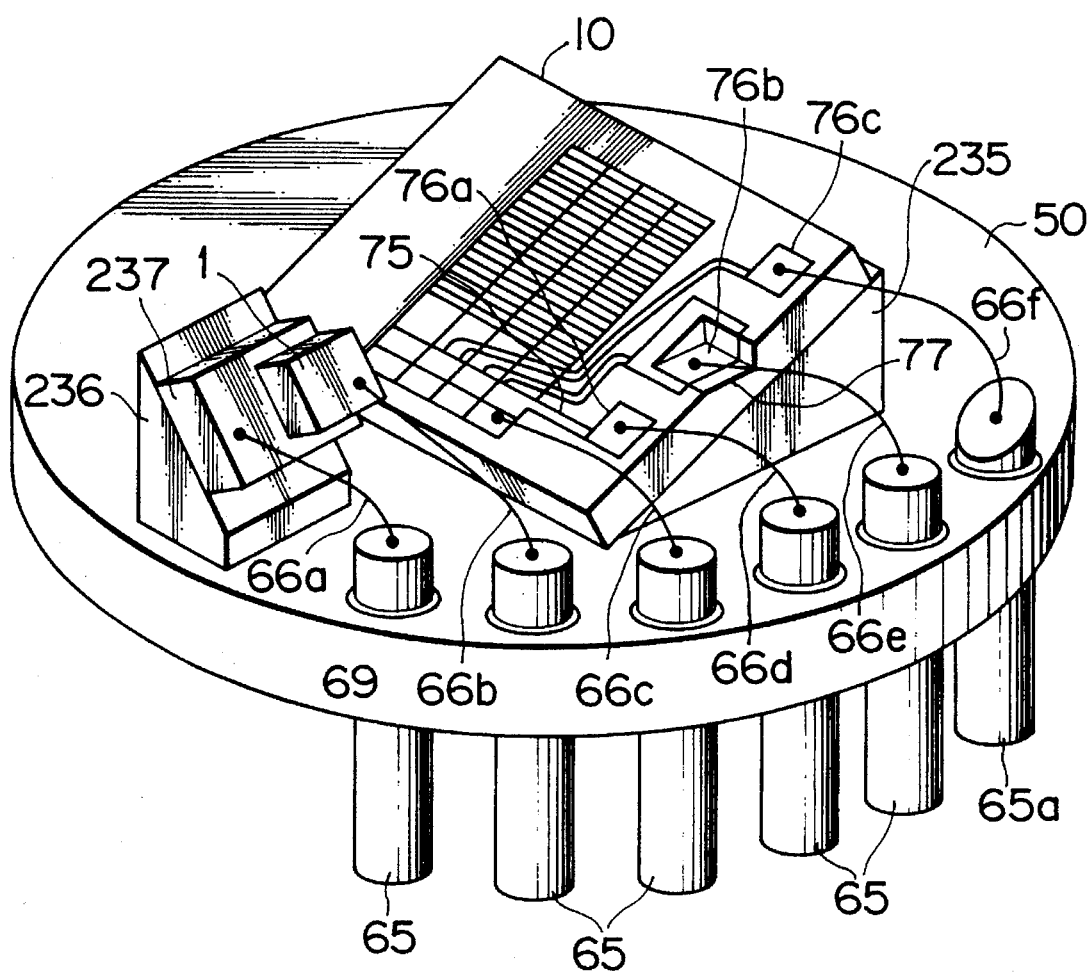
FIG. 6 is a perspective view of one example of the integrated photodetector and a semiconductor laser attached to an inner housing.

A supplemental description of FIGS. 1, 2 and 5 will be made next with respect to FIG. 6. FIG. 6 shows a process for supply of power to the semiconductor laser 1 and for extraction of signals from the photodetector 2 in FIG. 1 and is a perspective view of a part of the device of FIG. 1.

A chip base 235 having an upper tilted surface is formed on the inner housing 50 with the semiconductor substrate 10 constituting the photodetector 2 being fixed to the tilted surface. Fixed to the housing 50 is a laser base 236 having an upper tilted surface to which the semiconductor laser 1 being fixed through a laser base 237. Formed on the substrate 10 are the planar optical waveguides, incidence diffraction gratings, photodetector, and electrodes of FIG. 5.

Fixed to the housing 50 are conductive pins 65 through corresponding insulators 69. The pins 65 are connected through pieces of conductive wire 66b and 66a to the laser 1 and the base 237, respectively. Electric power is supplied from the pins 65 to the semiconductor laser 1 through the inner housing 50.

The electrodes 225 and 226 of FIGS. 1, 2 and 5 are formed on the substrate 10. A method of connecting the electrodes 225 and 226 and the pins 65 and extracting the output from the photodetector 2 of FIG. 1 to the outside will be described below.

1) One electrode and one pin 65 are connected by the piece of conductive wire 66c. This simplifies the structure advantageously.

2) One electrode is connected by a thin film lead 75 on the substrate 10 to a bonding pad 76a on the substrate 10. One pin 65 and the bonding pad 76a are connected by a piece of conductive wire 66d. This facilitates placement of the piece of wire 66d because the position of the boding pad is freely set.

3) A recess 77 is provided on the substrate 10 by using anisotropic wet etching in which the etching rate differs depending on the orientation of the crystals of the substrate 10. A bonding pad 76b is formed in a part of the recess 77. The electrode is connected by a thin film lead 75 on the substrate 10 to the bonding pad 76b on the substrate 10. One pin 65 is connected by a piece of conductive wire 66e to the bonding pad 76b. This facilitates provision of the piece of wire 66e because the pin 65 to which the piece of wire 66e is connected is substantially parallel to a surface of the bonding pad 76b.

4) The thin film lead 75 on the substrate 10 is connected to a bonding pad 76c on the substrate 10. The pin 65a and the pin 76c is connected by a piece of conductive wire 66f. In this case, a surface of the pin 65a to which the piece of wire 66f is bonded is rendered substantially parallel to the surface of the substrate 10 by bending the pin 65a, cutting the pin obliquely, or inclining the pin in a pressing process. This facilitates provision of the piece of wire 66f because the surface of the pin 65, to which the piece of wire 66f is connected is substantially parallel to the surface of the bonding pad 76c.

The electrodes are extended to the N-layer 222 of FIG. 2 as follows. The semiconductor base 10 is fixed with a conductive adhesive to the chip base 235. In this case, the chip base 235 and inner housing 50 are assumed to beforehand made of a conductive material such as metal. One of the pins 65 is fixed to the housing 50 without using an insulator 69.

Figure 7:
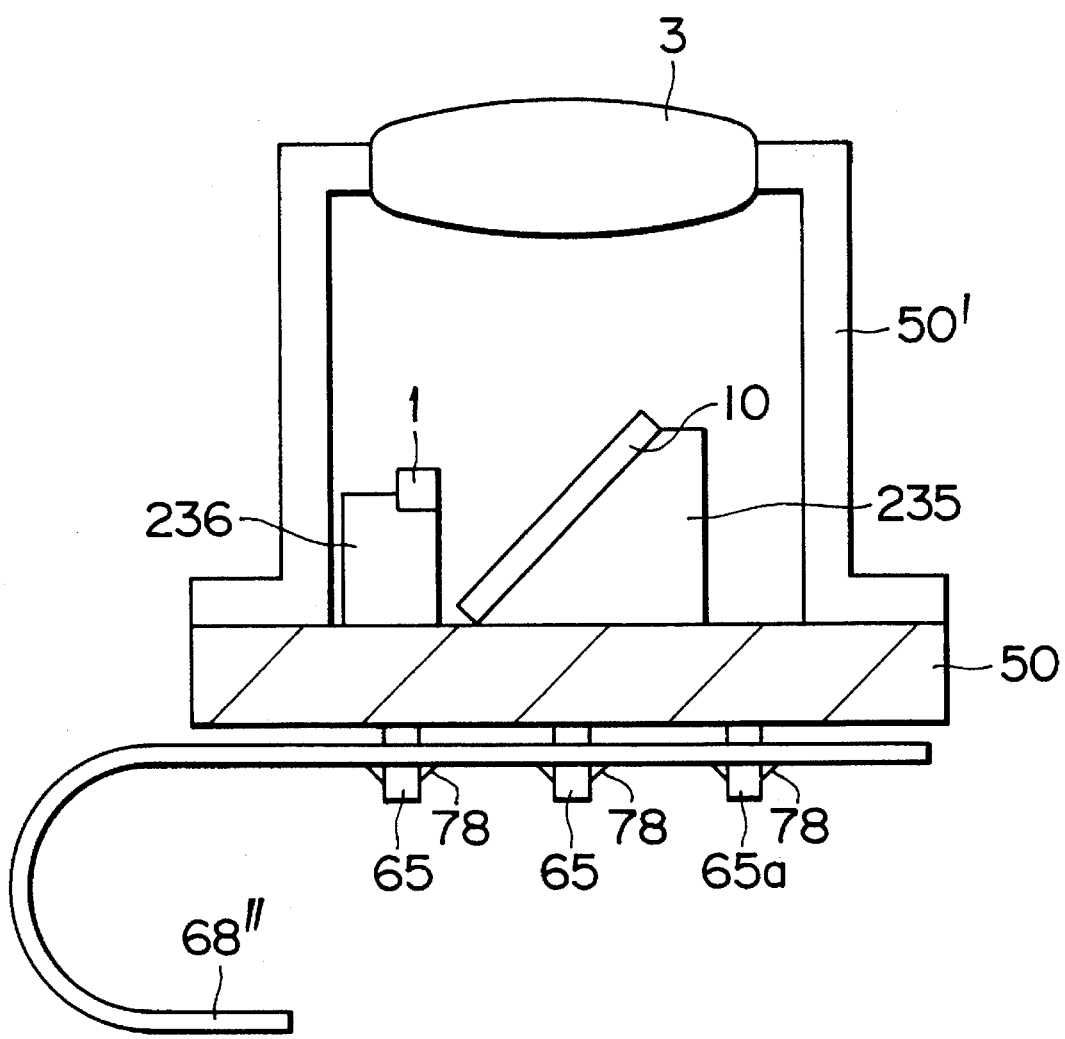
FIG. 7 is a cross-sectional view of an optical pickup device.

A supplementary description of FIGS. 2, 5 and 6 will be made next with respect to FIG. 7. FIG. 7 illustrates the connection of the pins 65 of FIG. 6 and the elastic leads 68 and 68' of FIG. 1 and the connection of the objective 3 of FIG. 1 and the housing 50 of FIG. 6.

In FIG. 7, the housing 50 has the chip base 235 formed thereon and the semiconductor substrate 10 is fixed to the chip base 235. The laser base 236 is formed on the housing 50, and the laser 1 is fixed to the base 236. The electrodes for supplying an output from the semiconductor substrate 10 and for supplying power to the laser 1 are connected to the pins 65 and 65a, which are connected with a conductive adhesive 78 such as solder to one end of elastic leads 68", for example, of an elastic printed board. The lead 68" is connected at the other end to the system controller 70 of FIG. 1. Thus, as described in FIG. 1, stabilized connection is ensured at all times even if the housing 50 moves relative to the system controller 70.

In FIG. 7, a cylindrical lens attaching sleeve 50' is fixed to the housing 50 with screws or an adhesive. The objective lens 3 is fixed to the sleeve 50' by bonding or fitting. This fixes the relative position of the housing 50 and the objective lens 3.

When the objective lens 3 is produced using a press or molds, the sleeve 50' and the objective lens 3 may be shaped as a unit with the same material to reduce the number of parts of the device.

As described above, according to the present embodiment, information is read out from the magneto-optic disk with high sensitivity and reliability. The device is small-sized and simple in structure and made of a small number of parts to thereby constitute a high reliability optical pickup device. The use of such pickup improves the reliability of the disk device or the optical information storage control apparatus.

A second embodiment of the present invention will be described with respect to FIG. 8 directed to an essential portion of the embodiment.

Figure 8:
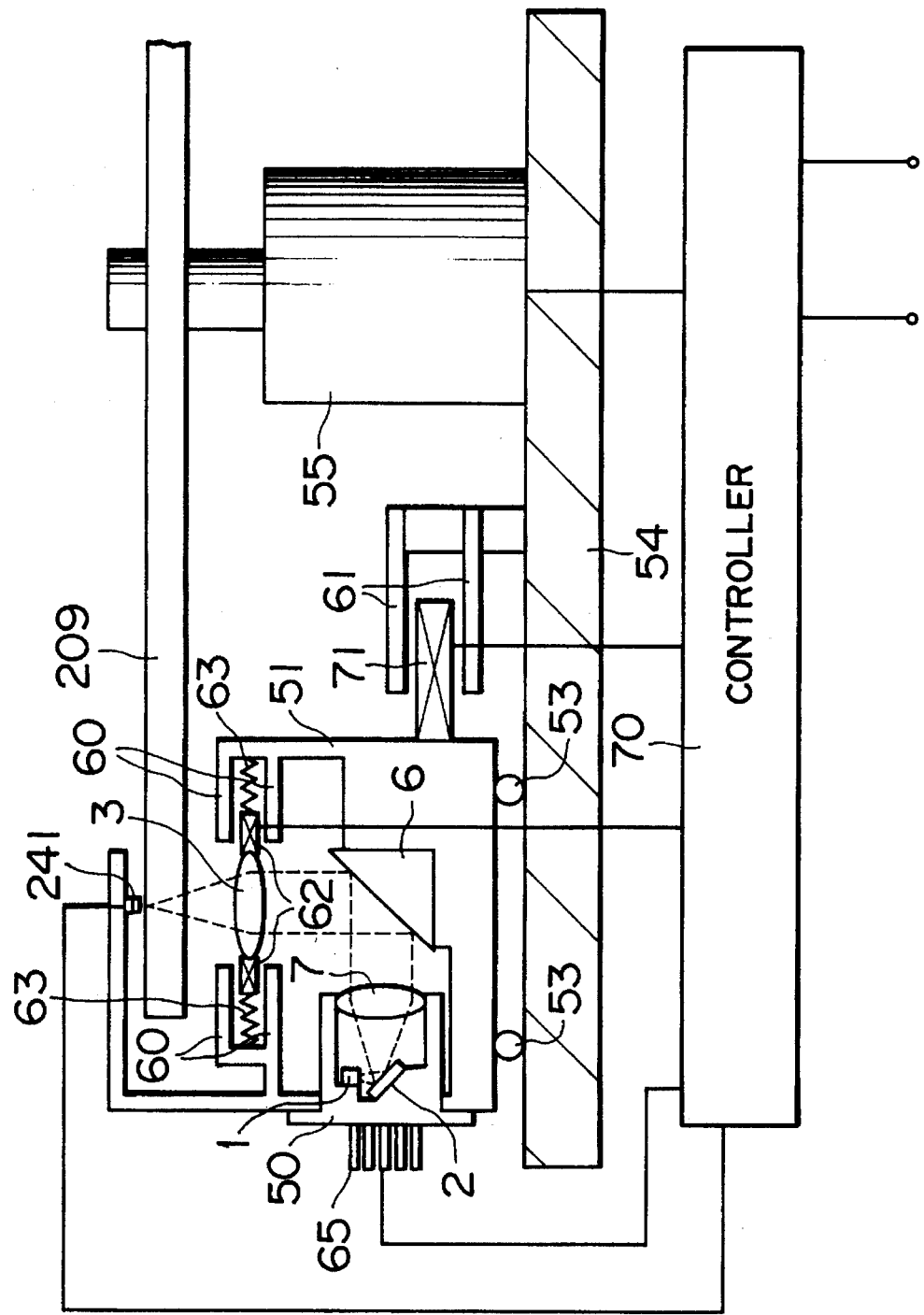
FIG. 8 is a schematic of an optical information storage medium control apparatus as a second embodiment of the present invention.

The magneto-optic disk device of FIG. 8 includes a unit base 54, a rotating motor 55 fixed to the unit base 54 for rotating an magneto-optic disk 209, an outer housing 51 attached through a linearly moving mechanism 53 to the unit base 54, an inner housing 50 fitted into an opening in a side of the outer housing 51, a semiconductor laser 1 attached to the inner housing 50, an integrated photodetector 2 attached to the inner housing 50 and irradiated with the source light from the laser 1, a collimating lens 7 attached to the housing 50 for allowing the irradiated light reflected by the photodetector 2 to pass therethrough, a reflective mirror 6 provided at a position on the outer housing 51 where the irradiated light enters, a pair of spaced flange-like magnetic circuit members 60 extending along the inner periphery of an upper end of the outer housing 51 near the periphery of the disk 209, an objective lens 3 disposed between the two magnetic circuit members 60 for allowing the irradiated light reflected by the reflective mirror 6 to pass therethrough, suspension members 63 for suspending the objective 3 lens through a finely movable electromagnetic coil 62 fixed to the objective lens 3, a pair of spaced magnetic circuit members 61 fixed to the unit base 54, a coarsely moving electromagnetic coil 71 disposed between the spaced magnetic circuit members 61 and fixed to the outer periphery of the outer housing 51, a biasing coil 241 disposed on a surface of the outer housing 51 opposing the disk 209, and a system controller 70 connected to the rotating motor 55, finely and coarsely electromagnetic coils 62, 71, semiconductor laser 1, integrated photodetector 2, and biasing coil 241.

As mentioned above, the objective lens 3 is held by the suspension members 63 so as to be movable in a direction normal to a recording surface of the disk 209 and radially of the disk 209.

The operation of the second embodiment will be described next. The source light from the laser 1 fixed to the inner housing 50 and driven by the system controller 70 is irradiated on the photodetector 2. The irradiated light from the photodetector 2 passes through the collimating lens 7 fixed to the housing 50 to be collimated rays of light, which are then reflected by the reflective mirror 6 and focused by the objective lens 3 to be irradiated on the disk 209. A reflection (signal light) from the disk 209 passes back through the objective lens 3 and the collimate lens 7 to be irradiated on the photodetector 2, which has the same structure as that mentioned above.

A signal is detected from the signal light which has entered the photodetector 2, and sent through the pin 65 to the system controller 70. In response to the detected focus error signal, the system controller 70 supplies an electric current to the finely moving coil 62 between the magnetic circuit members 60 to move the objective lens 3 in a direction normal to a surface of the disk 209 to thereby provide focus control.

In response to the detected track error signal and an information access request from the external device and received through the I/O bus, the controller 70 supplies an electric current to the coarsely moving electromagnetic coil 71 between the magnetic circuit members 61 to move the outer housing 51 mounted on the linearly moving mechanisms 53 radially of the disk 209. The system controller 70 supplies an electric current to the finely moving electromagnetic coil 62 between the magnetic circuit members 60 to move the objective lens 3 radially of the disk 209. As just mentioned above, by moving the outer housing 51 and the objective lens 3, track control for the disk 209 is provided.

The system controller 70 controls the motor 55 to rotate the disk and sends the read signal obtained as described above to the external device through the I/O bus.

In response to a write signal from the external device received through the I/O bus, the system controller 70 changes a drive current to the semiconductor laser 1 and hence the intensity of the laser irradiation. The system controller 70 also supplies an electric current to the biasing coil 241 attached to the outer housing 51 to apply a magnetic field to the portion of the disk 209 irradiated with the laser radiation. The controller 70 further modulates the electric current supplied to the biasing coil 241 to thereby write information. Erasure of information is effected in a similar process.

In order to perform the above operations, the system controller 70 is supplied with power from any external power supply (not shown).

By use of such structure, the weight of the element driven by the finely moving electromagnetic coil 62 is reduced compared to the embodiment of FIG. 1. Thus, the stabilization of the drive of the disk device and improvement to the reliability of the disk device against external disturbances are improved. In addition, since the performance of the pickup device is improved, the reliability of the entire disk device of FIG. 8 is improved similarly.

Figure 9:
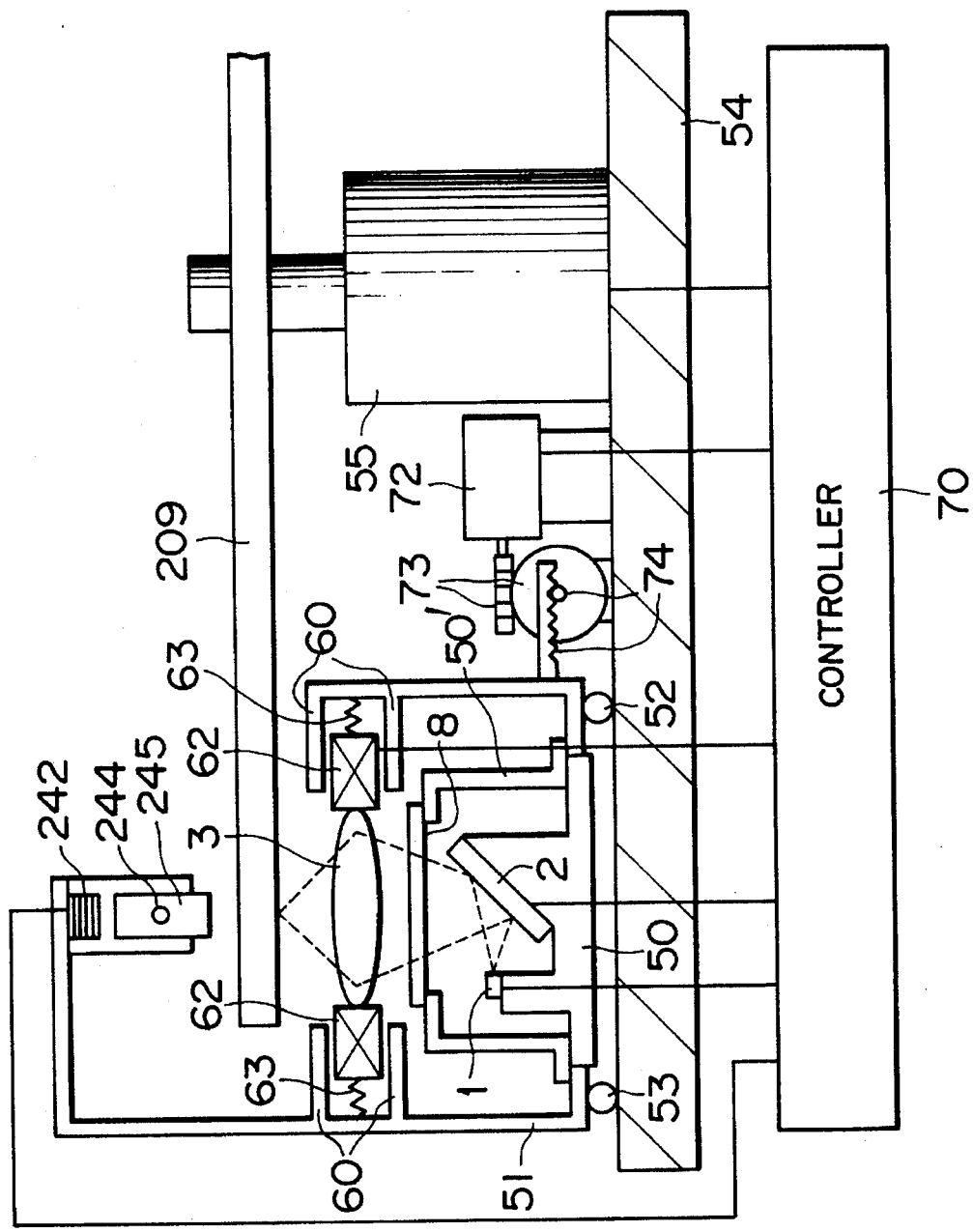
FIG. 9 is a schematic of an optical information storage medium control apparatus as a third embodiment of the present invention.

A third embodiment of the magneto-optic disk device according to the present invention will be described with respect to FIG. 9 showing the essential portion thereof. The disk device of FIG. 9 includes a unit base 54, a rotating motor 55 fixed to the unit base 54 for rotating an magneto-optic disk 209, an outer housing 51 mounted through a linearly moving mechanism 53 on the unit base 54, an inner housing 50 fitted into an opening in a bottom of the outer housing 51, a semiconductor laser 1 attached to the inner housing 50, an integrated photodetector 2 disposed at a position within the inner housing 50 and irradiated with the source light from the laser 1, a sleeve 50' disposed within the outer housing 51 so as to cover the inner housing 50, an optical window 8 disposed in an upper end of the sleeve 50' where the irradiated light reflected by the photodetector 2 passes, a pair of spaced flange-like magnetic circuit members 60 extending along from the inner periphery of a disk side end of the outer housing 51 near the periphery of the disk 209, an objective lens 3 disposed between the two magnetic circuit members 60 and in the optical path of the irradiated light which has passed through the optical window 8, suspension members 63 fixed between the two magnetic circuit members 60 for suspending the objective lens 3 through a finely movable electromagnetic coil 62 fixed to the periphery of the objective lens 3, a coarsely moving motor 72 fixed to the unit base 54 for driving a worm gear 73, a rack-pinion mechanism 74 fixed to the outer periphery of the outer housing 51 and driven by the worm gear 73, a coil 242 disposed on a surface of an upper extension of the outer housing 51 opposite to the disk 209, a biasing magnet 245 disposed on the disk side of the coil 242 so as to be rotatable around a rotational shaft 244 parallel to the recording surface of the disk 209, a rotating motor 55, the coarsely moving motor 72, a finely moving magnetoelectric coil 62, an integrated photodetector 2, and a system controller 70 connected to the laser 1 and the coil 242. The biasing magnet 245 rotates around the rotational shaft 244 depending on energization/denergization of the coil 242 so as to change the rotational position thereof.

The inner housing 50, lens attaching sleeve 50', and optical window 8 are connected one to another to thereby constitute a sealed structure. The inner housing 50 is fixed to the outer housing 51. The objective lens 3 held by the suspension members 63 is movable in a direction normal to a recording surface of the disk 209 and radially of the disk.

The operation of the third embodiment will be described below. The source light emitted from the semiconductor laser 1 fixed to the housing 50 and driven by the system controller 70 is irradiated on the photodetector 2. A reflection from the photodetector 2 as an irradiated light passes through the optical window 8 fixed to the lens attaching sleeve 50' and focused by the objective lens 3 to be irradiated on the disk 209. The signal light reflected from the disk 209 again passes back through the objective lens 3 and the window 8 to be irradiated on the photodetector 2. The photodetector 2 has the same structure as the photodetectors mentioned above.

In response to the focus error signal detected by the photodetector 2 in the process described so far, the system controller 70 supplies an electric current to the finely moving coil 62 between the magnetic circuit members 60 to move the objective lens 3 in a direction normal to a surface of the disk 209 to thereby provide focus control.

In response to the detected track error signal and an information access request received from the outside through the I/O bus, the controller 70 supplies an electric current to the coarsely moving motor 72 to rotate this motor. The rotational speed of the motor 72 is reduced by the worm gear 73 to cause the rack-pinion mechanism 74 to move the outer housing 51 mounted on the linearly moving mechanism 53 radially of the disk 209. The system controller 70 further feeds an electric current to the finely moving electromagnetic coil 62 between the magnetic circuit members 60 to move the objective lens 3 radially of the disk 209. As just mentioned above, by moving the outer housing 51 and the objective lens 3, track control for the disk 209 is provided.

The system controller 70 causes the motor 55 to rotate the disk and sends the read signal obtained as described above to the external device through the I/O bus.

In response to a write signal from the external device input through the I/O bus to the system controller 70, the system controller 70 modulates a drive current to the semiconductor laser 1 to thereby modulate the intensity of the source light. The outer housing 51 has the rotational shaft 244 attached thereto with the biasing magnet 245 being rotatable around the shaft 244. The system controller 70 supplies an electric current to the changeover coil 242 attached to the outer housing 51 to rotate and fix the biasing magnet 245 to and at such a rotational position where a magnetic field suitable for writing/erasing information is formed on that portion of the disk 209 where the laser light is irradiated to thereby write information. Erasure of information is effected using a similar process.

In order to perform the above operations, the system controller 70 is supplied with power from any external power supply (not shown).

By use of such structure, a high reliability disk device is realized even when it suffers from a load and vibrations during transportation or outdoor use of the disk device.

Figure 10:
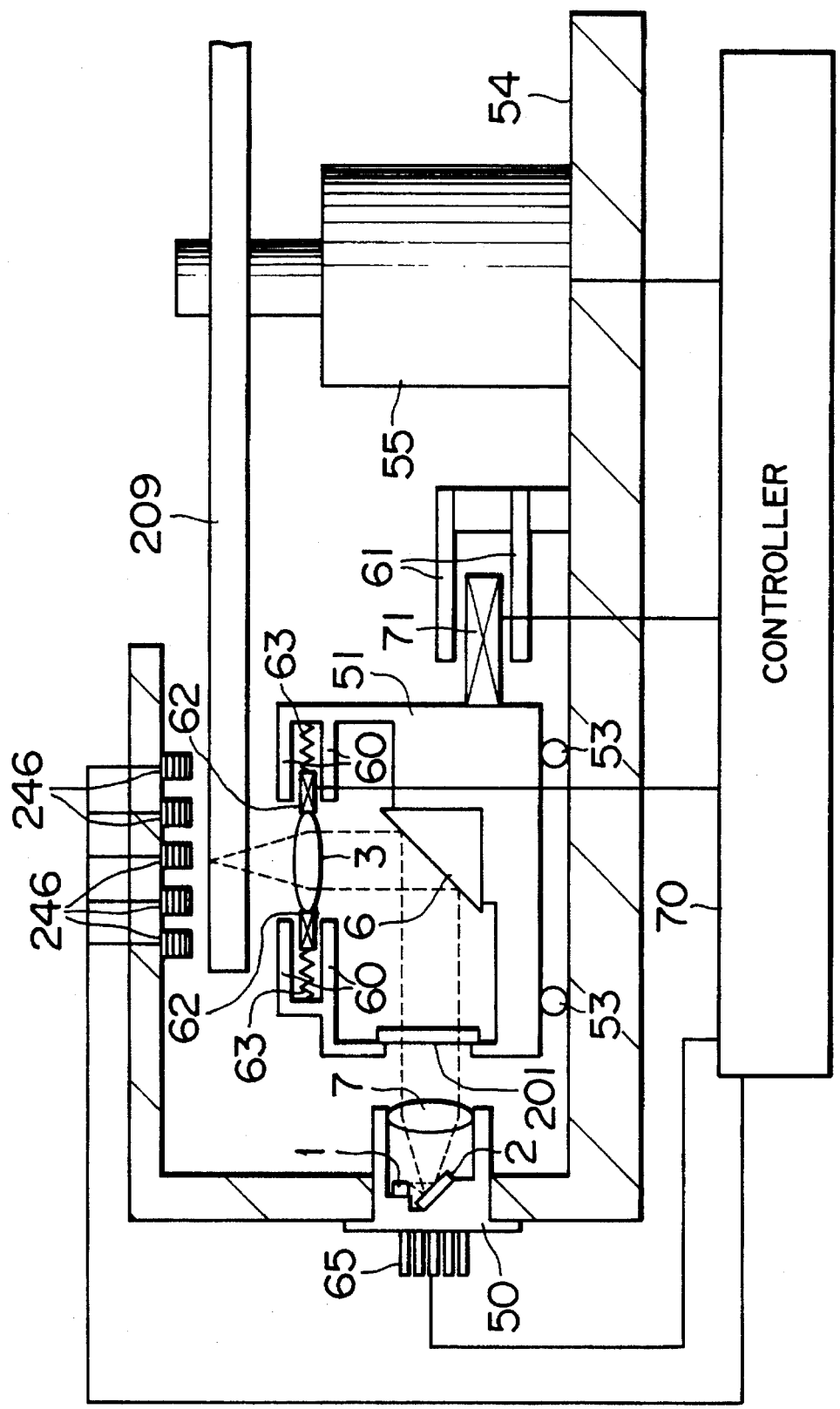
FIG. 10 is a schematic of an optical information storage medium control apparatus as a fourth embodiment of the present invention.

A fourth embodiment of the disk device according to the present invention will be described with respect to FIG. 10. The disk device of FIG. 10 has the same structure as the second embodiment of FIG. 8 except that in the embodiment of FIG. 10 the unit base 54 has a C-like cross section; that a housing 50 is not connected to the housing 51, but is fitted into an opening in a vertical wall of the unit base 54 having the C-like cross section such that the irradiated light enters a reflective mirror 6 through a transparent window 201 in a side of the housing 51; and that a plurality of biasing coils 246 is not attached to the outer housing 51, but disposed at a position on an upper side of the C-like unit base 54 opposite the peripheral portion of the disk 209. Since other components of the disk device are the same as the corresponding ones of the second embodiment of FIG. 8, each of the other components is identified by the same reference numeral as that used for the corresponding one of the components of the second embodiment of FIG. 8 and further description thereof will be omitted.

The operation of the fourth embodiment will be described below. In FIG. 10, the source light emitted from the semiconductor laser 1 fixed to the housing 50 and driven by the system controller 70 is irradiated on the photodetector 2. An irradiated light reflected from the photodetector 2 passes through the collimating lens 7 fixed to the housing 50 to be collimated rays of light, which pass through the transparent window 201 fixed to the outer housing 51, are reflected by the reflective mirror 6, and then focused by the objective lens 3 on the disk 209. The signal light reflected by the disc 209 passes back through the objective lens 3 and the collimate lens 7 to be irradiated on the photodetector 2. The photodetector 2 has the same structure as the photodetectors mentioned above.

The objective lens 3 is held by the suspension members 63 and is movable in a direction normal to a recording surface of the disk 209 and radially of the disk 209.

The photodetector 2 detects a signal from the signal light which has been irradiated thereon in the process described so far and sends the signal through the pin 65 to the system controller 70.

In response to the detected focus error signal, the system controller 70 supplies an electric current to the finely moving coil 62 between the magnetic circuit members 60 to move the objective lens 3 in a direction normal to a surface of the disk 209 to thereby provide focus control. In response to the detected track error signal and an information access request from the outside and received through the I/O bus, the controller 70 supplies an electric current to the coarsely moving electromagnetic coil 71 between the magnetic circuit members 61 to move the outer housing 51 mounted on the linearly moving mechanism 53 radially of the disk 209. The system controller 70 further supplies an electric current to the finely moving electromagnetic coil 62 between the magnetic circuit members 60 to move the objective lens 3 radially of the disk 209. As just mentioned above, by moving the housing 51 and the objective lens 3, track control for the disk 209 is provided.

The system controller 70 causes the motor 55 to rotate the disk and sends the read signal obtained as described above to the external device through the I/O bus. In response to a write signal from the external device input through the I/O bus to the system controller 70, the system controller 70 modulates a drive current to the semiconductor laser 1 to modulate the intensity of the source light from the laser 1. The plurality of biasing coils 246 are provided on the unit base 54. The system controller 70 selects one or more of the biasing coils 246 provided near a point on the disk 209 to which the laser radiation is irradiated, depending on the position of the housing 51, supplies an electric current to the selected coil(s) 246 to generate a magnetic field to thereby write information. Erasure of information is effected in a similar process.

In order to perform the above operations, the system controller 70 is supplied with power from any external power supply (not shown).

By use of such structure, the housing 50 is disconnectable from the housing 51 which is a movable element in information access; that is, the movable element is reduced in weight; and the weight of the element driven by the finely moving electromagnetic coil 62 is reduced. Thus, the stabilization of drive of the disk device and the reliability of the disk device against external disturbances are improved. In addition, the reliability of the entire magneto-optic disk device of FIG. 10 is improved similarly.

Figure 11:
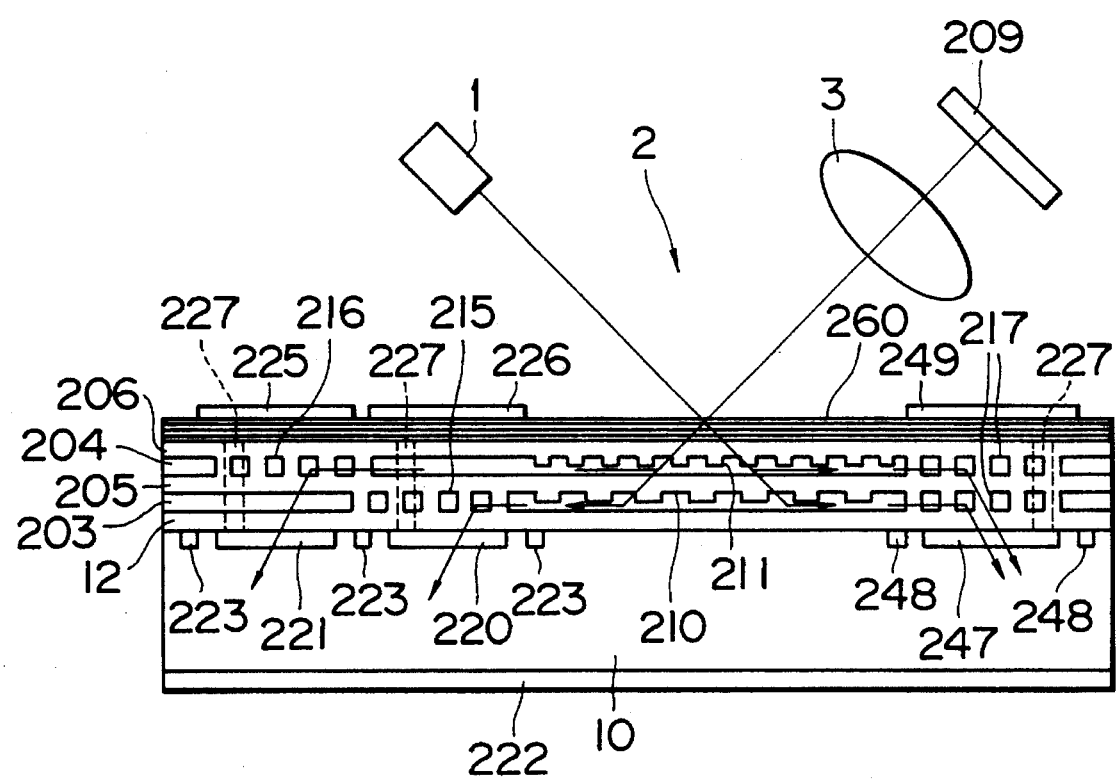
FIG. 11 is a cross-sectional view of another integrated photodetector.

Another embodiment of the integrated photodetector 2 will be described with respect to FIG. 11. This photodetector as it is may be used in the embodiments of FIGS. 4, 8 and 9. FIG. 11 is a cross-sectional view of an integrated photodetector 2 similar to that of FIG. 2.

The semiconductor substrate 10 has thereon disk device components each having the same structure and purpose as a corresponding one described with respect to FIG. 2: that is, a buffer layer 12, a lower planar optical waveguide 203, an intermediate layer 205, an upper planar optical waveguide 204, a protective layer 206, a lower incidence diffraction grating 210, an upper incidence diffraction grating 211, an upper outgoing diffraction grating 216, a lower outgoing diffraction grating 215, P-layers 220, 221, an N-layer 222, a channel stopper 223, and electrodes 225 and 226. An outgoing diffraction grating 217 is provided on the right-hand side of the lower and upper incidence diffraction gratings 210 and 211, respectively, in FIG. 11. A P-layer 247 is provided at a position on the semiconductor substrate 10 corresponding to the position of the outgoing diffraction grating 217. The P-type layer 247 is surrounded with a channel stopper 248.

A half mirror 260 is formed over the protective layer 206 to control the reflectivity of the source light from the laser 1 and hence the quantity of light guided to the disk 209. The half mirror 260 is composed of a thin single conductive or dielectric film or a lamination of thin conductive or dielectric films. An electrode 249 is formed at a position on the half mirror 260 corresponding to the position of the outgoing diffraction grating 217.

Contact holes 227 are formed through all the buffer layer 12, lower planar optical waveguide 203, intermediate layer 205, upper planar optical waveguide 204, protective layer 206, and half mirror 260. The electrodes 225, 226 and 249 are electrically connected to the P-layers 221, 220, and 247, respectively.

A part of the source light entering the photodetector 2 passes through the half mirror 260 to become guided rays of light in the lower and upper incidence diffraction grating 210 and 211. The guided rays of light are irradiated through the outgoing diffraction grating 217 from the waveguides to enter a PIN-type photosensor composed of the P-layer 247 surrounded by the channel stopper 248, semiconductor substrate 10 and N-layer 222 and are converted to electric currents in the photosensor. The source light entered from the laser 1 to the upper and lower planar optical waveguides 204 and 203 are diffracted by the outgoing diffraction grating 217 and detected as the source light from the laser 1.

The output signals from the electrodes 225 and 226 are subjected to the same processing as described so far. The output signal from the electrode 249 is supplied to the system controller 70, as described above. The output signal from the electrode 249 is the intensity of the source light itself which the laser 1 emits. The system controller 70, described so far, adjusts the quantity of an electric current injected to the laser 1 on the basis of the output signal from the electrode 249 to thereby maintain the intensity of the source light from the laser 1 at a value expected at all times. This provides a magneto-optic disk device which has high resistance to temperature changes and aging.

A part of the signal light from the disk 209 passes through the half mirror 260. A predetermined signal is obtained from the signal light which has passed through the mirror 260 using the operative principles described so far to operate the disk device.

Figure 12:
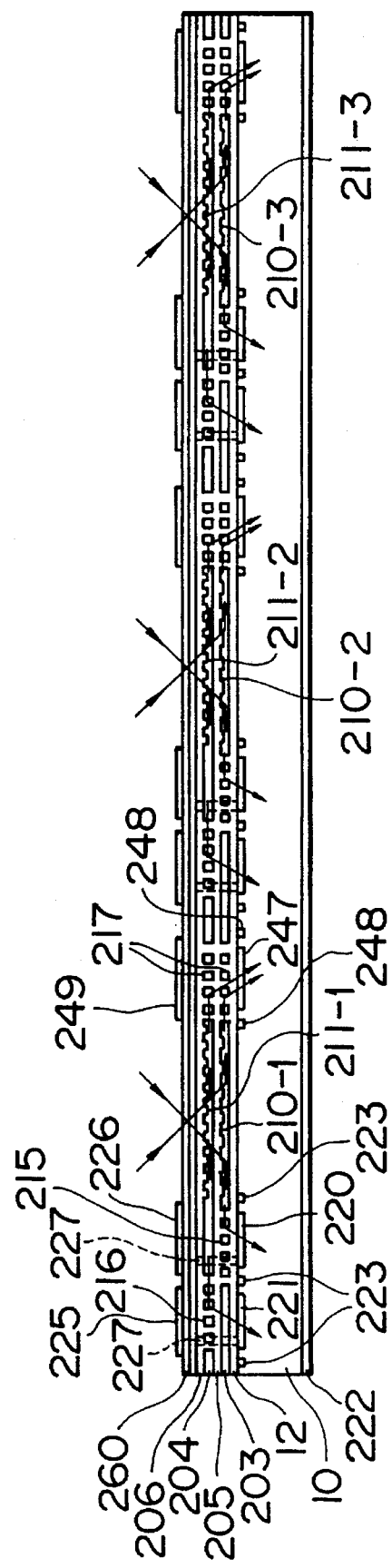
FIG. 12 is a cross-sectional view of a further integrated photodetector and taken along the line XII—XII in FIG. 13.
Figure 13:
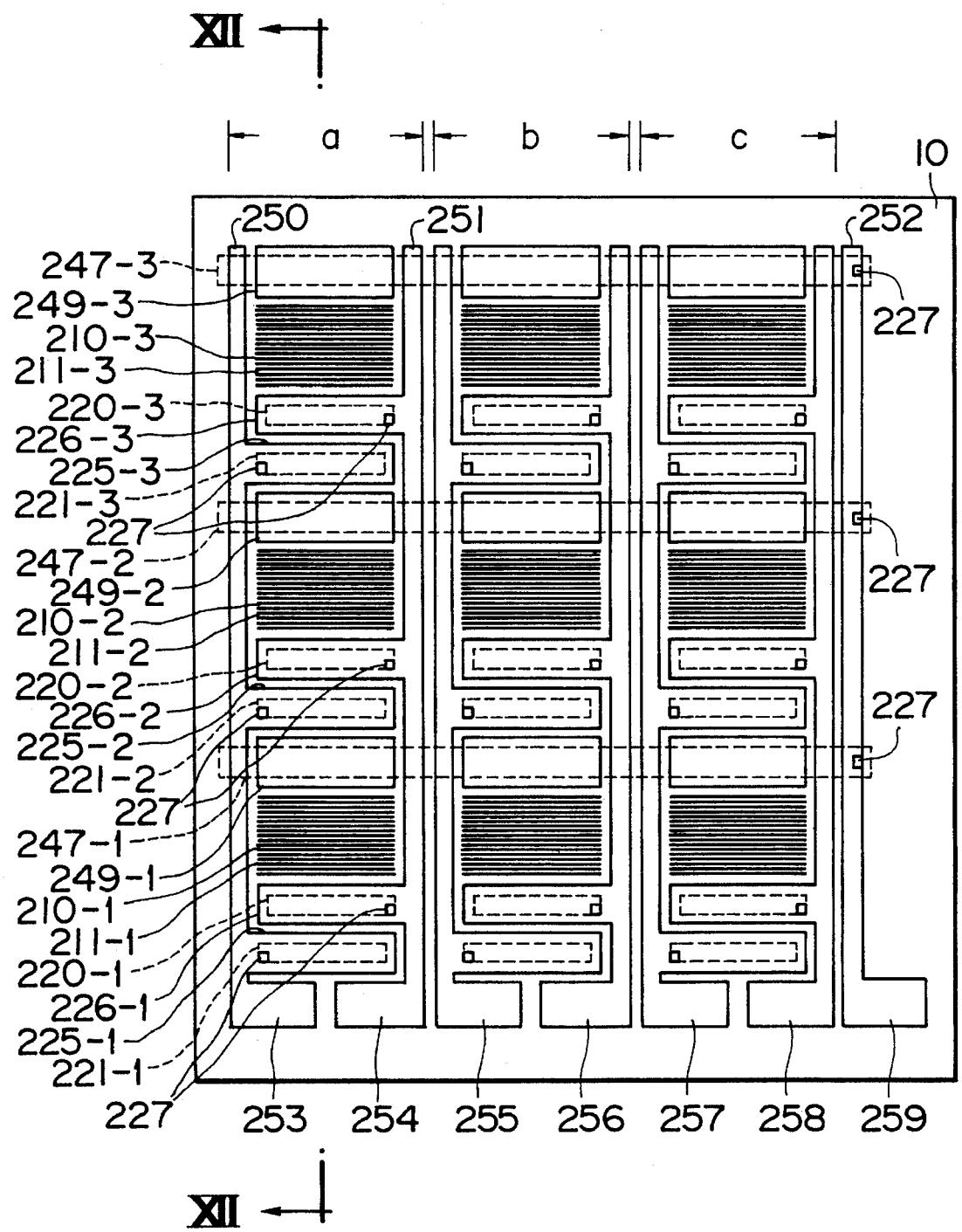
FIG. 13 is a plane view of the integrated photodetector of FIG. 12.

A further embodiment of the photodetector 2 described so far will be described next with respect to FIGS. 12 and 13. The intact photodetector described here may be used in the respective embodiments of FIGS. 1, 8–10. FIG. 12 is a cross-sectional view of the photodetector 2 taken along the optical axis of the guided light. FIG. 13 is a top plan view of the photodetector 2.

In FIG. 12, the semiconductor substrate 10 has thereon different disk device components each having the same structure and purpose as a corresponding one described with respect to FIG. 11: that is, a buffer layer 12, a lower planar optical waveguide 203, an intermediate layer 205, an upper planar optical waveguide 204, a protective layer 206, a half mirror 260, and electrodes 225, 226. P-layers 220, 221 are formed at positions on the semiconductor substrate 10 corresponding to the electrodes 225, 226 and surrounded by corresponding channel stoppers 223. The lower and upper incidence diffraction gratings 210 and 211 of FIG. 11 are divided in a direction traverse to the optical axis of the guided light to form lower incidence diffraction gratings 210-1 to 210-3 and upper incidence diffraction gratings 211-1 to 211-3. The outgoing diffraction gratings 217 each is provided between lower incidence diffraction gratings 210-1 and 210-2, between lower incidence diffraction gratings 210-2 and 210-3, between upper incidence diffraction gratings 211-1 and 211-2, and between upper incidence diffraction gratings 211-2 and 211-3. A P-layer 247 and an electrode 249 are provided at positions on the semiconductor substrate 10 and half mirror 260, respectively, corresponding to the position of the outgoing diffraction grating 217. The P-type layer 247 is surrounded by a channel stopper 248.

Since the operations of the lower and upper incidence diffraction gratings 210-1 and 211-1 and their peripheries are equal to those of the lower and upper incidence diffraction gratings 210-2 and 211-2, and the lower and upper incidence diffraction gratings 210-3 and 211-3, only the operations of the lower and upper incidence diffraction gratings 210-1 and 211-1 and their peripheries will be described next.

A part of the source light entering from the semiconductor laser 1 into the photodetector 2 passes through the half mirror 260 to become guided rays of light in the lower and upper incidence diffraction gratings 210-1 and 211-1. The guided rays of light pass through the lower and upper planar optical waveguides, are irradiated through the outgoing diffraction gratings 217 from the waveguides to enter the PIN-type photosensor composed of the P-layer 247 surrounded by the channel stopper 248, semiconductor substrate 10 and N-layer 222 and are converted into electric currents in the photosensor. The P-layer 247 is connected electrically to the electrode 249 in the contact hole 247.

A part of the signal light reflected by the disk 209 and entering into the photodetector 2 passes through the half mirror 260 to become guided rays of light in the lower and upper incidence diffraction gratings 210-1 and 211-1. The guided rays of light are irradiated from the waveguides through the lower and upper outgoing diffraction gratings 215 and 216 to enter a PIN-type photosensor composed of a P-layer 220 surrounded by the channel stopper 223, semiconductor substrate 10 and N-layer 222, and a PIN-type photosensor composed of a P-layer 221 surrounded by the channel stopper 223, semiconductor substrate 10 and N-layer 222 and are converted into electric currents in the respective photosensors. The P-layers 220 and 221 are connected electrically to electrodes 226 and 225 in a contact hole 227.

The technique for separation of the polarization is similar to that described with respect to FIGS. 2, 5, 6 and 11.

A supplementary description of FIG. 12 will be made with respect to FIG. 13 which is a top plan view of the photodetector 2. A pattern on the substrate 10 is separated into columns a, b and c. FIG. 12 is a cross-sectional view of one column. Since the respective columns have basically the same structure and perform basically the same operation, the structure and operation of the column a will here be described mainly.

A part of the signal light becomes guided rays of light in the lower and upper incidence diffraction gratings 210-1 and 211-1. The guided rays of light are supplied as signals to the electrodes 226-1 and 225-1 leading through the contact holes 227 to the P-layers 220-1 and 221-1, respectively. Similarly, a part of the signal light becomes guided rays of light in the lower and upper incidence diffraction gratings 210-2 and 211-2. The guided rays of light are supplied as signals to the electrodes 226-2 and 225-2 leading through the contact holes 227 to the P-layers 220-2 and 221-2, respectively. Similarly, a part of the signal light becomes guided rays of light in the lower and upper incidence diffraction gratings 210-3 and 211-3. The guided rays of light are supplied as signals to the electrodes 226-3 and 225-3 leading through the contact holes 227 to the P-layers 220-3 and 221-3, respectively.

The electrodes 225-1, 225-2 and 225-3 are connected by a thin film lead 250 and the total sum of the output signals from those electrodes is output to a bonding pad 253. The electrodes 226-1, 226-2 and 226-3 are connected by a thin film lead 251 and the total sum of the output signals from those electrodes is output to a bonding pad 254. This applies quite similarly to the columns b and c where the total sums of the respective output signals from the photosensors are output to the corresponding bonding pads 255–258.

A part of the source light becomes guided rays of light in the respective lower and upper incidence diffraction gratings 210-1 and 211-1. Those guided rays of light are sensed by the P-layer 247-1. A part of the source light becomes guided light in the respective lower and upper incidence diffraction gratings 210-2 and 211-2. Those guided rays of light are sensed by the P-layer 247-2. A part of the radiated light becomes guided rays of light in the respective lower and upper incidence diffraction gratings 210-3 and 211-3. Those guided rays of light are sensed in P-layer 247-3. The respective P-layers 247-1, 247-2 and 247-3 of the columns are connected to each other and connected through the contact hole 227 to the thin film 252. The total sum of the sensed signals is output to the bonding pad 259.

The output of the bonding pad 259 is used to control the semiconductor laser 1 of FIG. 11.

The system controller 70 of each of the embodiments of FIGS. 1–11 processes the outputs from the bonding pads 253–258 to provide the respective read signal, track error signal and focus error signal by the following calculations:

The read signal=(253)–(254)+(255)– (256)+(257)–(258)

The track error signal=(253)+(254)–(257)– (258)

The focus error signal=(253)+(254)–(255)– (256)+(257)+(258)

The above bracketed numbers represent the respective reference numerals of the bonding pads and also the corresponding magnitude of the currents flowing through the bonding pads.

Processing similar to that described with respect to FIGS. 1–11 is performed on the basis of those signals.

By dividing the incidence diffraction grating across the optical axis of the guided light as in the present embodiment, the opening area of each incidence diffraction grating is reduced, a deterioration in the optical performance of the disk device due to wavelength fluctuations is prevented and an allowance for errors in the assembly and adjustment is increased.

Figure 14:
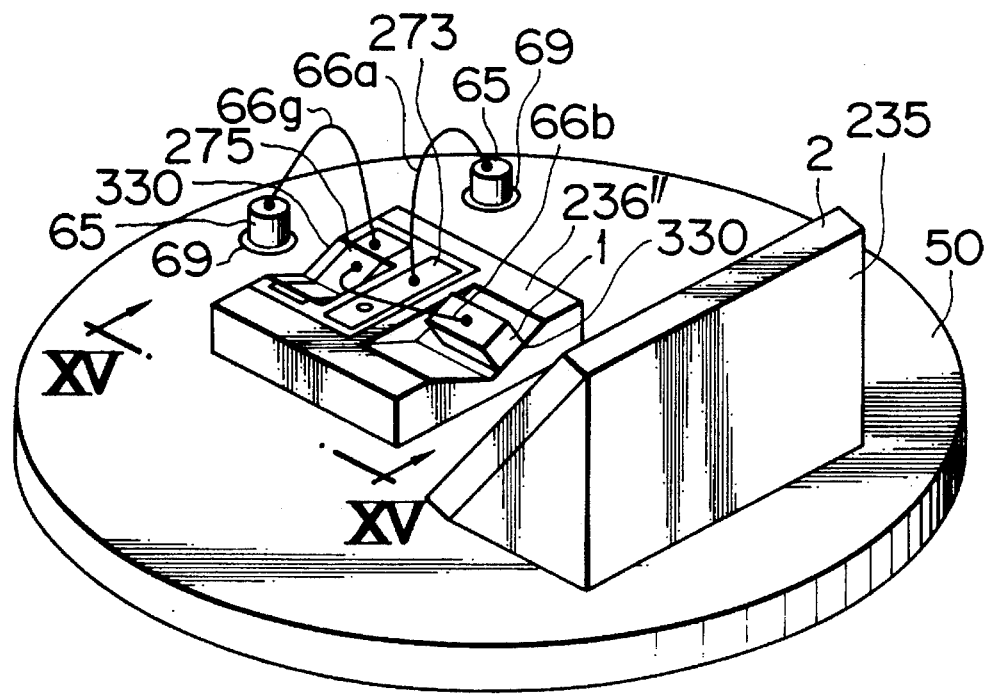
FIG. 14 is a perspective view of an integrated photodetector and a semiconductor laser attached differently to the inner housing.
Figure 15:
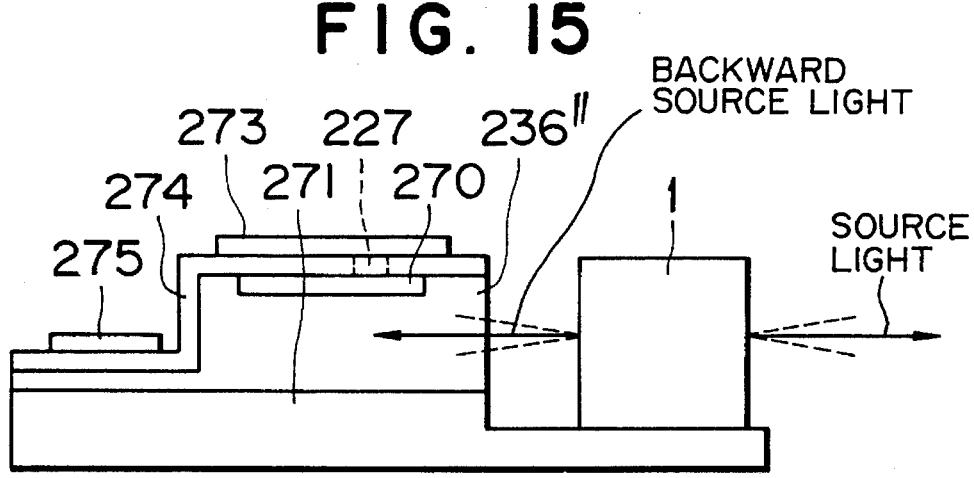
FIG. 15 is a diagrammatic cross-sectional view taken along the line XV—XV of FIG. 14.

FIGS. 14 and 15 illustrate further attachment of the semiconductor laser 1 and the photodetector 2. This attachment is different from that of the semiconductor laser 1 of FIG. 1. Other structures and constructions are similar to those of FIG. 6. FIG. 15 shows a cross section of a section to which the semiconductor laser of FIG. 14 is attached.

In FIG. 14, a chip base 235 with a tilted surface is attached to the housing 50 and the integrated photodetector 2 is attached to the base 235. The photodetector 2 is the same in structure and function as the photodetectors mentioned above. Pins 65 are attached through insulators 69 to the housing 50. A laser base 236" with a tilted surface is attached on the side of the housing 50 facing the photodetector 2.

The semiconductor laser 1 is attached to a surface of the laser base 236" tilted relative to the upper surface of the housing 50. By setting the angle of the tilted surface of the laser base 236" to the upper surface of the housing 50 at an appropriate value, the angle between the plane of polarization of the laser 1 and the plane of incidence for the source light is ranged from 5 to 85 degrees to thereby achieve reading information written in the disk.

When the laser base 236" is made of a single crystal such as silicon, a tilt 330 is formed on the laser base 236" by anisotropic wet etching along the crystal surface of the single crystal. The formation of the tilt by this process facilitates work in a small area of the laser base 236".

A P-layer 270 and an N-layer 271 are formed on an upper and a lower surface, respectively, of the laser base 236" to thereby form a PIN photosensor. An insulating layer 274 is formed on the upper surface of the laser base 236" with an electrode 273 being formed on the insulating layer 274. The electrode 273 is connected electrically to the P-layer 270 through the contact hole 227 formed in the insulating layer 274. The electrode 273 is connected through a piece of wire 66a to one pin 65.

The laser base 236" receives backward source light from the laser 1 provided on the tilt thereof. On the basis of the reception of the source light from the laser 1, the photodetector 2 output a signal, which is supplied from the contact hole 227 provided in the insulating layer 274 to the electrode 273 formed on the insulating layer 274, and hence through a piece of wire 66a to the pin 65 and then to the system controller 70.

The laser base 236" is also provided with another tilted surface 330 on which a tilt degree changing electrode 275 is provided, in addition to the tilted surface on which the laser 1 is attached. The tilt degree changing electrode 275 can be provided on the insulating layer 274 which is provided on the laser base 236". The tilt degree changing electrode 275 is also connected not only to the tilted surface 330 but also to a flat surface of the laser base 236". The laser side surface of the piece of wire 66b connected at one end to the laser 1 is not parallel to the surface of the pin 65 to which the piece of wire 66b is connected at the other end. Thus, the piece of wire 66b as it is can be difficult to directly connect to the pin 65 as the case may be. To avoid this situation, the surface of the laser 1 to which the piece of wire is connected is arranged to be parallel to the surface of the tilt degree changing electrode 275 formed on the tilted surface 330 of the laser base 236". In this case, the surface of the laser 1 to which the piece of wire is connected and the tilt degree changing electrode 275 are easily connected by the piece of wire 66g. Further, by causing part of the tilt degree changing electrode 275 to be parallel to the surface of the pin 65 to which a piece of wire is connected, the tilt degree changing electrode 275 and the surface of the pin 65 to which the piece of wire is connected are easily connected by the piece of wire 66g. The connection of the laser 1 and the pin 65 is easily made indirectly due to the use of the tilt degree changing electrode 275.

Figure 16:
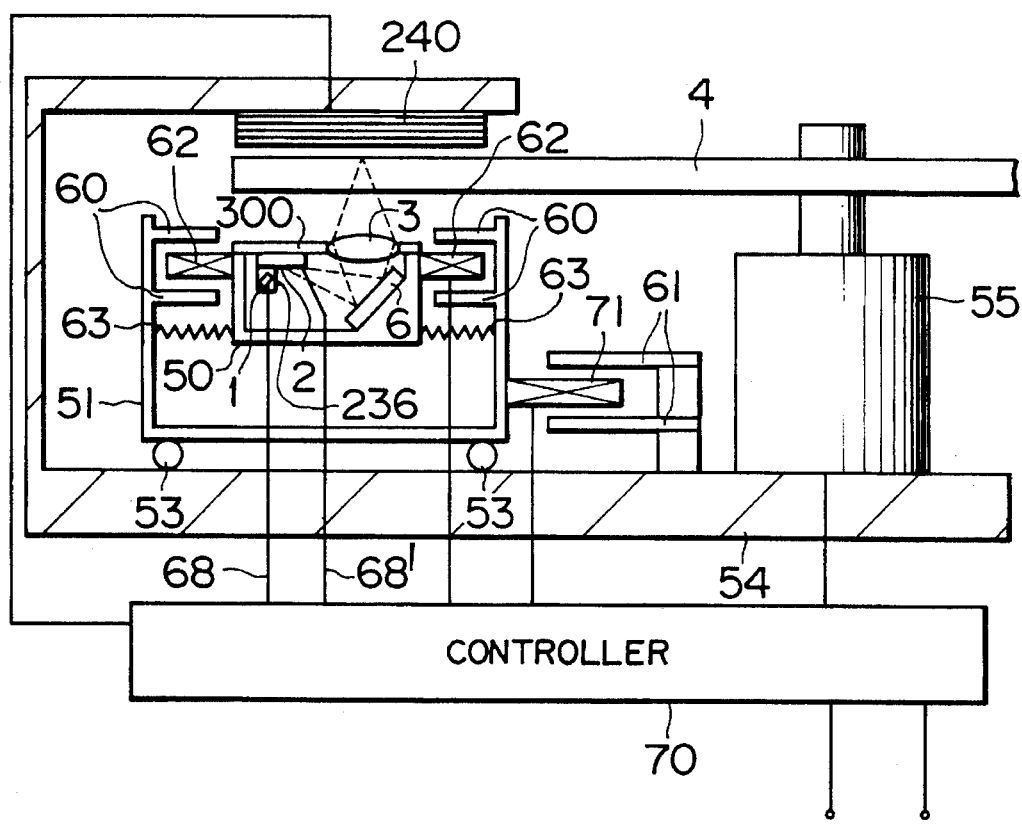
FIG. 16 is a schematic of an optical information storage medium control apparatus as a fifth embodiment of the present invention.

FIG. 16 shows an optical disk device which is an optical information storage control apparatus as a fifth embodiment of the present invention and is not the magneto-optic disk device so far described.

In FIG. 16, an inner housing 50 of the optical pickup device is closed at an upper end with a cap 300 to the inner surface of which an integrated photodetector 2 and an objective lens 3 are attached. The laser base 236 is attached to one end of the photodetector 2, and a laser 1 as the laser source is attached to the laser base 236. The laser 1 is operated by a system controller 70 which is connected by a flexible lead 68 to the laser 1.

A source light emitted from the laser 1 is irradiated on the photodetector 2. An irradiated light reflected from the photodetector 2 is reflected by a reflective mirror 6 fixed to the bottom of the inner housing 50 to pass through the objective lens 3 to thereby be irradiated on an optical disk 4 as the optical information storage medium. A reflection or signal light from the disk 4 passes back through the objective lens 3 to be reflected by the reflective mirror 6 and irradiated on the photodetector 2.

Figure 17:
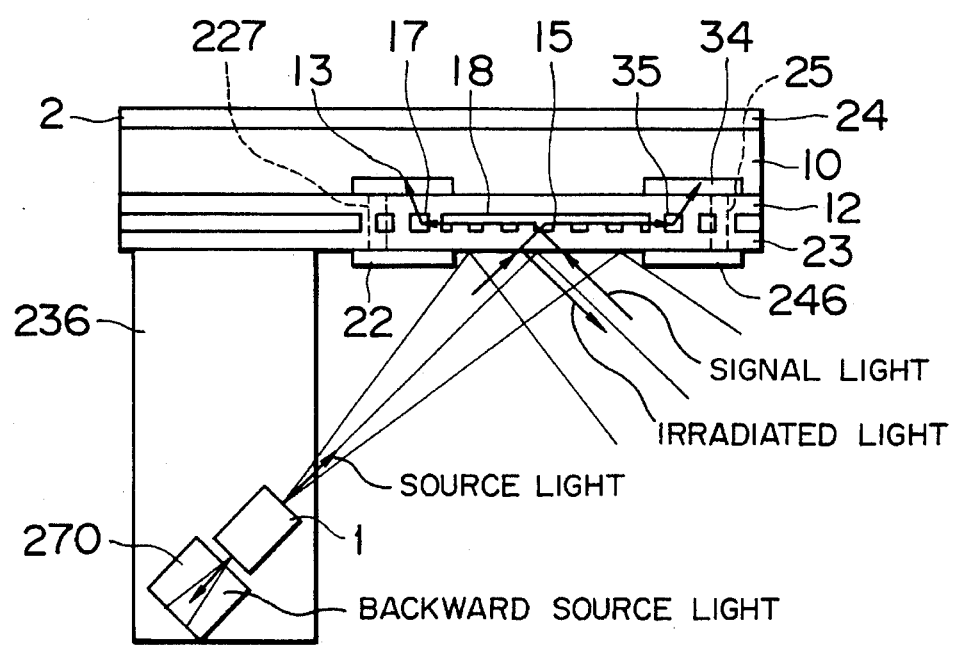
FIG. 17 is an enlarged view of an integrated photodetector and a semiconductor laser of FIG. 16.

The photodetector 2 has a cross-sectional structure of FIG. 17 to convert the signal light into an electric signal with the cross section extending along the optical axis of the guided light.

In FIG. 17, the photodetector 2 includes a photosensor, a single-layered planar optical waveguide and an incidence coupler integrated as a unit with a buffer 12, a planar optical waveguide 18 and a protective layer 23 formed on a semiconductor substrate 10 thereof.

The planar optical waveguide 18 is larger in refractive index than the buffer layer 12 and the protective layer 23. The signal light entering the planar optical waveguide 18 propagates toward an end of the waveguide 18 depending on the direction of incidence of the light. An incidence diffraction grating 15 and outgoing diffraction gratings 35 and 17 composing an incidence coupler in the protective layer 23 are provided on a lower surface, and opposite ends of the planar optical waveguide 18, respectively.

The laser base 236 is attached to a semiconductor substrate 10 of the photodetector 2. A part of a source light from the laser 1 fixed to the laser base 236 is reflected by the protective layer 23 before the incidence diffraction grating 15 to be irradiated light while a part of the remaining irradiation is diffracted by the incidence diffraction grating 15 to be guided light which propagates through the planar optical waveguide 18 toward the outgoing diffraction grating 35. The guided light is diffracted by the outgoing diffraction grating 35 to enter the substrate 10.

The semiconductor substrate 10 has a PIN-type photosensor formed thereon. That is, the substrate 10 itself is of the thin-N type or intrinsic type where a relatively small numbers of impurities is implanted. The PIN-type photosensor is composed of the substrate 10, and a P-layer (where high-density P-type impurities are implanted) 34 and an N-layer (where high-density N-type impurities are implanted) 24 holding the substrate 10 between the P-layer 34 and the N-layer 24. The source light diffracted by the outgoing diffraction grating 35 enters the P-layer 34 as a light receiving surface where it is converted into an electric current having a magnitude proportional to the intensity of the source light. That current signal is extracted out of the substrate 10 through the electrode 246 connected to the P-layer 34 in the contact hole 227 and fed to the system controller 70.

The system controller 70 changes the electric current which drives the laser 1 depending that signal such that the intensity of the source light has a predetermined value at all times. Use of the photodetector 2 of such structure brings about direct measurement and high accuracy control of the intensity of the irradiated light and hence improvement to the reliability of the device.

While in the present embodiment the photosensor of the semiconductor substrate 10 is illustrated as being of the PIN-type as viewed from the side of the waveguide, it may be of an NIP-type. Alternatively, it may be of a PN-type or of an NP-type when the semiconductor substrate itself is of high-density impurity type.

In order to detect the intensity of the irradiation, the backward source light from the laser 1, that is, the light may be used which is irradiated from the laser 1 in a direction reverse to the direction in which there is the photosensor 2 as viewed from the laser 1.

To detect the backward source light to control the intensity of that light in the system controller 70, a P-layer 270 is required to be provided at a position to which the backward source light from the laser base 236 of a semiconductor material is irradiated, as shown in FIG. 17, and the laser base itself is required to be used as a photoelectric converter. In this case, the outgoing diffraction grating 35, P-layer 34, and electrode 246 on the side of the photodetector 2 for measuring the intensity of the direct light are not required and hence the structure of the photodetector 2 is simplified.

The signal light reflected by the disk 4 and entering the photodetector 2 is diffracted by the incidence diffraction grating 15 which constitutes the incidence coupler to be guided light which propagates through the planar optical wavelength 18 toward the outgoing diffraction grating 17. This guided light is diffracted by the outgoing diffraction grating 17 to enter the P-layer 13 as the light receiving surface in which high density P-type impurities are implanted and to be converted into an electric current by the photosensor of the PIN-type structure of the semiconductor substrate 10 as in the irradiated light.

This current is extracted out of the semiconductor substrate 10 from the electrode 22 connected to the P-layer 13 through the contact hole 227, and supplied to the system controller 70 which detects a track error signal, a focus error signal and a read signal from the extracted current.

The inner housing 50 of the pickup device is held by the suspension members 63 up within the outer housing 51 so as to be movable in a direction normal to a recording surface of the disk 4 and radially of the disk 4, as shown in FIG. 16.

The movement of the inner housing 50 is made by magnetic circuits formed between the magnetic circuit members 60 and the coil 62 and between the magnetic circuit members 61 and the coil 71 by control of electric currents supplied to the finely and coarsely moving electromagnetic coils 62 and 71 in the system controller 70. That is, the system controller 70 supplied an electric current to the electromagnetic coil 62 so as to form a magnetic circuit between the coil 62 and the magnetic circuit member 60 depending on a focus error signal to move the inner housing 50 in a direction normal to a surface of the disk 4 to provide focus control.

Further, the controller 70 supplies an electric current to the coarsely moving coil 71 to form a magnetic circuit between the coil 71 and the magnetic circuit members 61 in conformity to a track error signal detected on the basis of a signal from the photodetector 2 and an information access request received through an I/O bus (not shown) from an external device (not shown) to thereby move the outer housing 51 on the linearly moving mechanism 53 radially of the disk 4. The system controller 70 also supplies an electric current to the finely moving coil 62 to form a magnetic circuit between the coil 62 and the magnetic circuit members 60 to thereby move the inner housing 50 radially of the disk 4. As just described above, by moving the housings 51 and 50, track control for the disk 4 is provided.

The system controller 70 drives the rotating motor 55 to rotate the disk 4 to thereby supply the read signal, obtained as above, through the I/O bus to the external device.

The system controller 70 modulates a drive current to the laser 1 in accordance with a write signal received through the I/O bus from the outside to change the intensity of the source light from the laser 1 to thereby write information on the disk 4. Erasure of information is made in a similar process.

Writing/reading into/from the disk 4 is made as follows: In response to a write signal received from the external device through the I/O bus, the system controller 70 modulates the drive current to the laser 1 to change the intensity of the source light from the laser 1 and also supplies an electric current to the biasing coil 240 attached to the unit base 54 to apply a magnetic field to that portion of the disk on which the laser light is irradiated to thereby write information there. Erasure of information is made in a similar process.

The system controller 70, the linearly moving mechanism 53, the magnetic circuit members 61 and the rotating motor 55 are attached to the unit base 54 as the housing for the disk device. A loading mechanism (not shown) for loading/removing the disk 4 on/from the motor 55 is also provided on the unit base 54.

Figure 18:
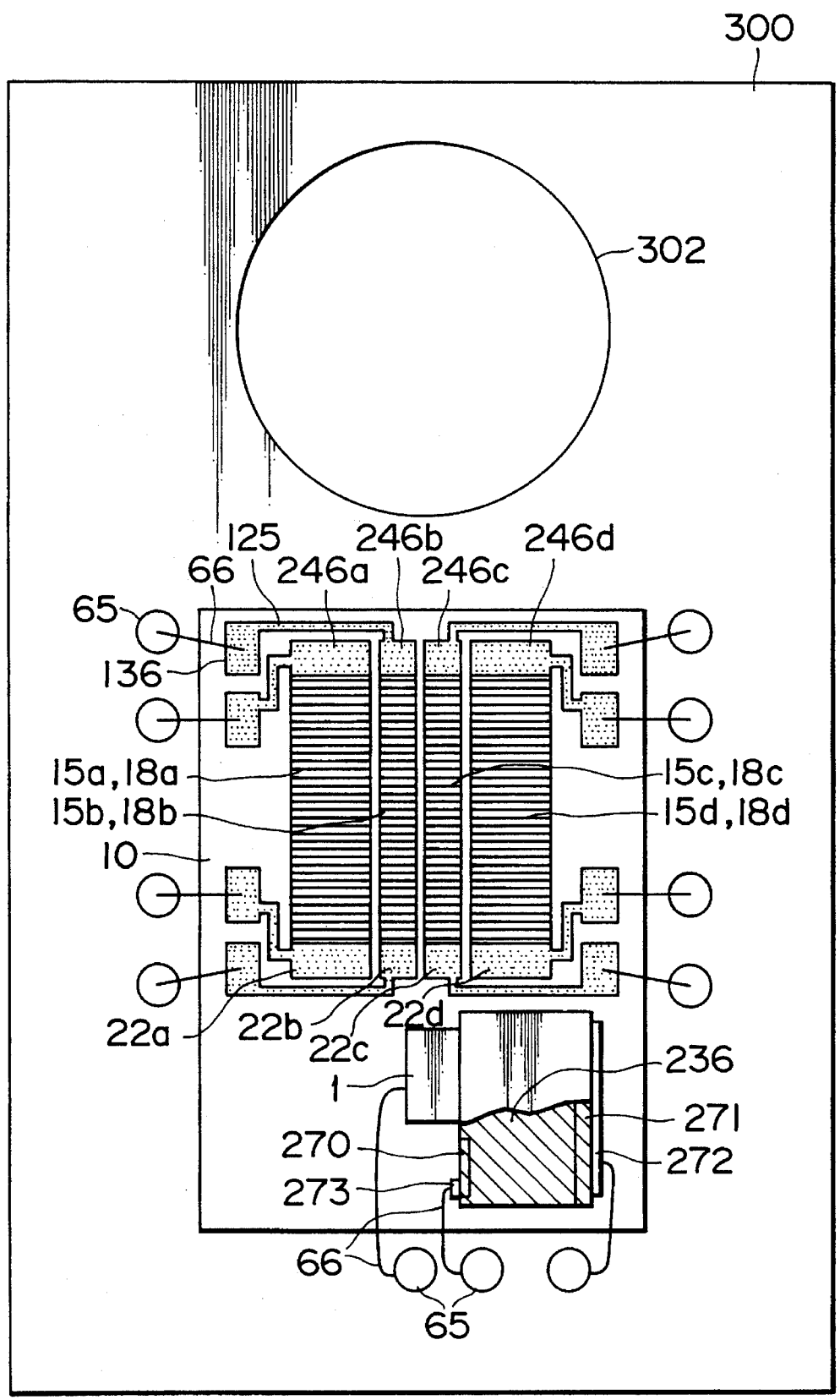
FIG. 18 is a plan view of an optical pickup device of FIG. 16.

FIG. 18 shows an illustrative structure of the cap 300, laser base 236, laser 1, and photodetector 2 and their vicinities of the pickup device of FIG. 16, as viewed from below.

In FIG. 18, planar optical waveguides 18a–18d are formed in four rows on the semiconductor substrate 10 and have corresponding incidence diffraction gratings 15a–15d. Electrodes 22a–22d and 246a–246d corresponding to the electrodes 22, 24 of FIG. 17 are formed at opposite ends of the waveguides 18a–18d. Outgoing diffraction gratings (not shown) corresponding to the diffraction gratings 17, 35 of FIG. 17 and P-layers (not shown) corresponding to the P-layers 13, 34 of FIG. 17 are formed below the electrodes 22a–22d and 246a–246d.

The source light entering the incidence diffraction gratings 15a–15d propagates through the corresponding planar optical waveguides 18a–18d to be converted to electric currents depending on the strengths of the guided rays of light as in the above embodiments. The intensity of the guided rays of light are detected separately in the waveguides 18a–18d. The detected signals are extracted out of the respective electrodes 246a–246d, and supplied through the leads 125 on the substrate to the corresponding bonding pads 136, from which the signals are supplied to the outside from the pins 65 connected through the pieces of wire 66 to the respective pads 136.

The semiconductor substrate 10 is beforehand positioned such that the optical axis of the signal light irradiated on the waveguides 18a–18d passes along the division line between the waveguides 18b and 18c. Since the signal light is not generally collimated rays of light, the shape of an upper surface of the incidence diffraction grating is generally a curved grating. When the focus is exactly on the disk 4, their source light and the signal light of FIG. 17 have conjugate wave fronts. Thus, the source light and the signal light each are converted to guided light by the same incidence diffraction grating.

The signal rays of light which have entered the incidence diffraction gratings 15a–15d propagate through the planar optical waveguides 18a–18d to be converted into corresponding currents depending on the intensity of the signal rays of light, as in the above embodiments. The respective intensity of the signal rays of light are detected independently in the corresponding waveguides 18a–18d. The detected signals are extracted from the electrodes 22a–22d, the extracted signals are supplied to the bonding pad 136 through the leads 125 on the semiconductor substrate 10 and supplied to the outside from the pins 65 connected through the pieces of wire 66 to the respective bonding pads 136.

The system controller 70 calculates an irradiated light intensity signal, read signal, track error signal, and focus error signal on the basis of signals from the respective electrodes 22a–22d, 246a–246d as follows:

The radiated light strength signal= 246a+246b+246c+246d

The read signal=22a+22b+22c+22d

The track error signal=22a+22b–22c–22d

The focus error signal=22a–22b–22c+ 22d

The numerals accompanied by corresponding characters in the above expressions represent the corresponding magnitude of the currents flowing through the electrodes identified by those numerals accompanied by the corresponding characters.

The irradiated light intensity signal is the sum of signals at the electrodes 246a–246d, so that the respective electrodes may be short-circuited by leads 125 for adding purposes.

While in FIG. 18 four planar optical waveguides 18a–18d are illustrated as being used, three planar optical waveguides 18a–18c may be used to fulfill an equivalent function. The numerals accompanied by corresponding characters in the above expressions represent the corresponding magnitude of the currents flowing through the electrodes identified by those numerals accompanied by the corresponding characters. An irradiated light intensity signal, read signal, track error signal, and focus error signal are calculated by the following expressions:

The irradiated light intensity signal= 246a+ 246b+246c

The read signal= 22a+22b+22c

The track error signal=22a–22c

The focus error signal=22a–22b+22c

The optical axis of the signal light is assumed to be at or near the center of the planar optical waveguide 18b. When the three planar optical waveguides are used, as mentioned above, the pattern on the semiconductor substrate is simplified and easily created. When the above-mentioned 4 divided planar optical waveguides are used, the sensitivity of detection of the track error signal is improved.

In FIG. 18, a laser base 236 is attached to the semiconductor substrate 10 and a semiconductor laser 1 is attached to the laser base 236. When the semiconductor substrate 10 is used as the laser base 236, a photosensor which is used to measure the intensity of backward source light may be provided on the laser base 236, as shown in FIG. 17.

As shown in FIG. 18, a photosensor is provided which has a PIN structure composed of a P-layer 270, a thin-N type or intrinsic laser base 236, and an N-layer 271 to convert the backward source light into an electric current. The electric current is supplied from the electrodes 272, 273 through pieces of wire 66 and a pin 65 to the external system controller 70, which uses that signal for control of the intensity of the source light from the semiconductor laser 1 as requested.

The semiconductor substrate 10 is fixed to the cap 300 with the pins 65. Those pins are made of a conductor, so that the cap 300 should be made of a nonconductive material in order to prevent short-circuiting among the pins. When the cap 300 should be made of a conductive material, an insulating material should be provided between the cap 300 and the respective pins 65.

While in FIG. 18 the laser base 236 is shown as being attached to the semiconductor substrate 10, the laser base may be directly attached to the cap 300 instead. The optical operation is the same in either of those cases. Any of those cases may be selected depending on the convenience of composition.

A lens fitting hole 302 is provided in the cap 300 for fitting the objective lens 3 therein. The condition, etc., of fitting the objective lens 3 will be described later.

Figure 19:
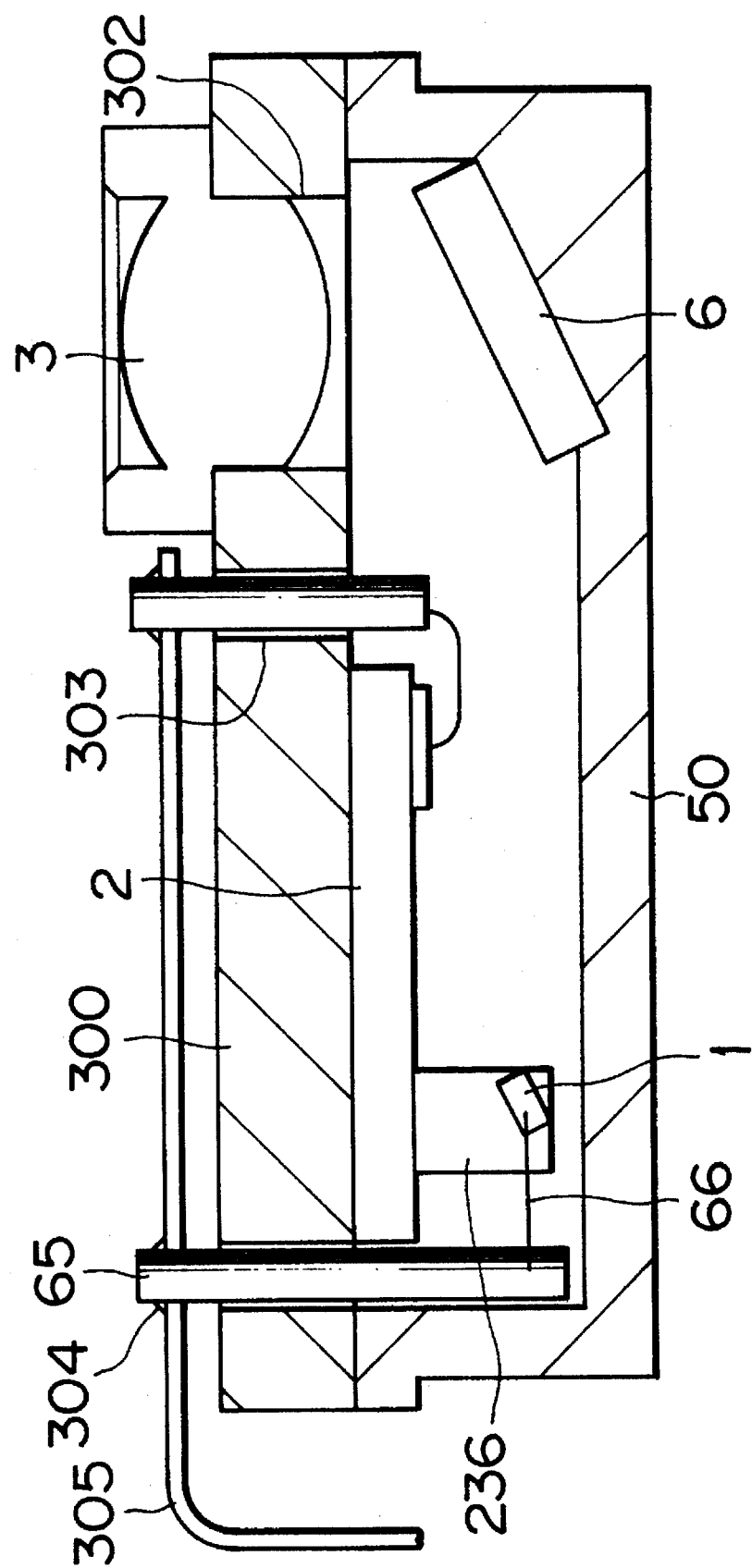
FIG. 19 is a cross-sectional view of another optical pickup device.

FIG. 19 shows an illustrative cross-sectional structure of the housing 50 and cap 300 of the optical pickup device and their peripheries of FIGS. 16-18.

In FIG. 19, the objective lens 3 is fitted in the lens fitting hole 302 provided in the cap 300 to which the integrated photodetector 2 is attached. Attached to the photodetector 2 is the laser base 236 to which the laser 1 is attached. As described above, the laser base 236 may be attached directly to the cap 300. For heat radiation of the laser 1, it is desirable to make the cap from a material such as a metal of high heat transfer. In this case, the pins 65 each should be fixed to the cap 300 with a non-conductive adhesive material 303.

Pieces of wire 66 from the pins 65 are connected to those portions of the laser 1 and photodetector 2 which require wiring. The pins 65 are connected by soldering to flexible leads 305 on a flexible printed board or the like. Those leads are connected to the system controller 70.

The reflective mirror 6 is attached to one end of the bottom of the housing 50, is covered at its upper end with the cap 300. The housing 50, cap 300, objective lens 3, etc., hold the housing inside in an air-tight state. The housing inside is filled with an inert gas (not shown) to ensure the stable operation of the laser 1.

In the pickup device described with respect to FIGS. 16–19, the reflective mirror 6 is disposed between the objective lens 3 and the photodetector 2. The objective lens 3 and the photodetector 2 are disposed in the same plane. Thus, the pickup device is reduced in thickness to thereby improve the reliability thereof and hence the miniaturization and reliability of the overall optical disk device.

Figure 20:
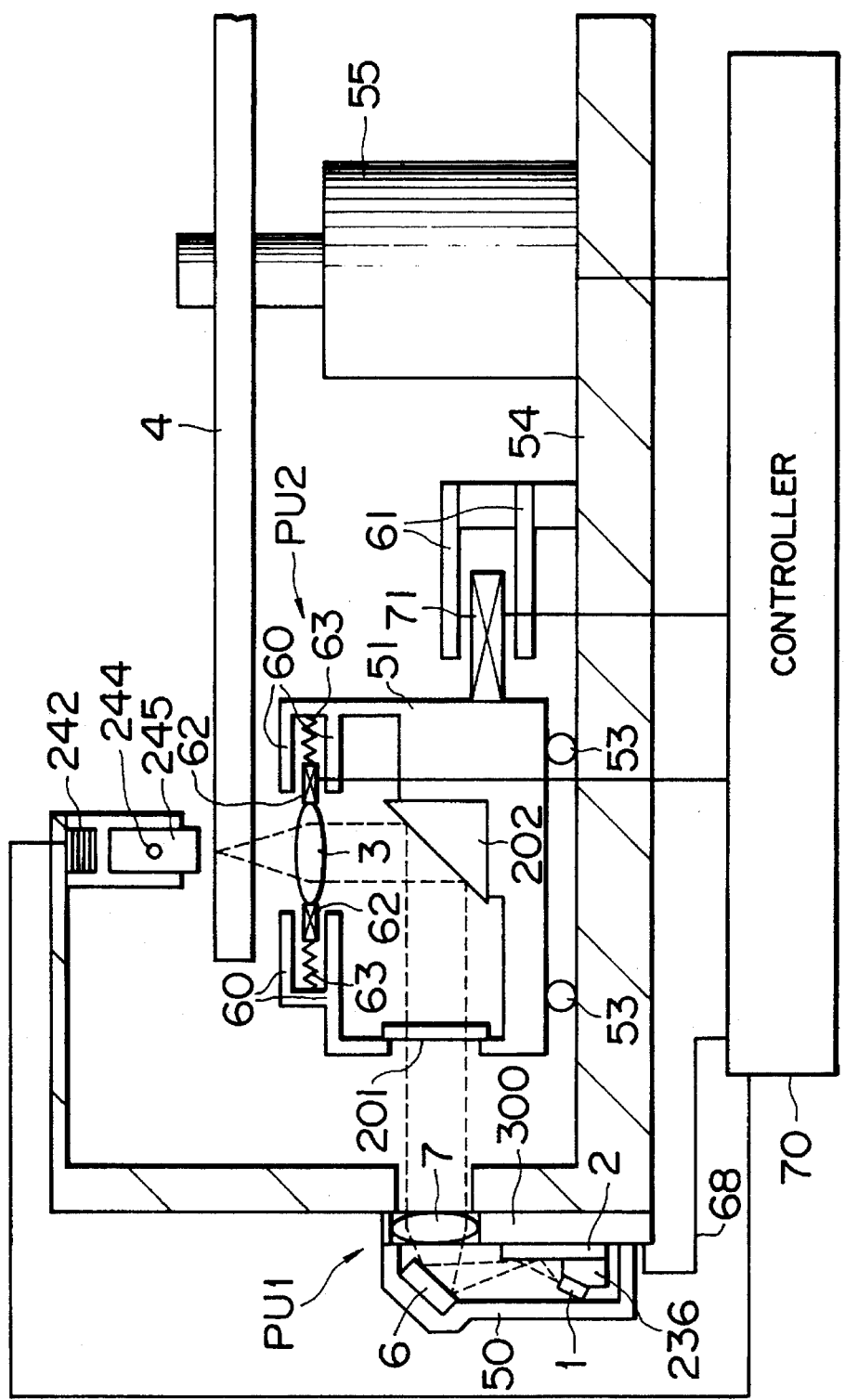
FIG. 20 is a schematic of an optical information storage medium control apparatus as a sixth embodiment of the present invention.
Figure 21:
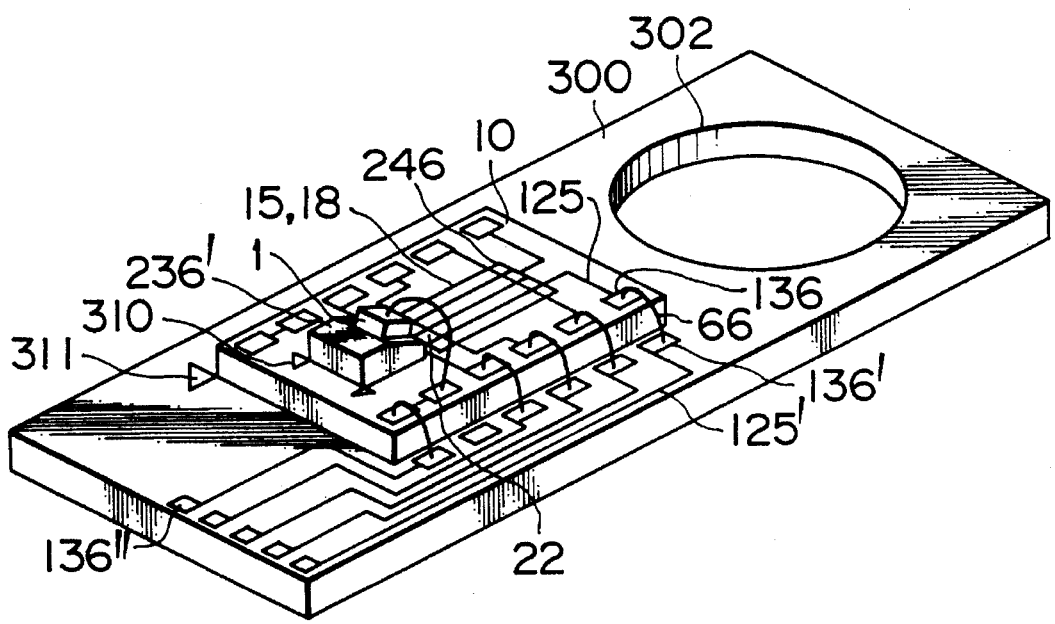
FIG. 21 is a perspective view of one example of the structure of a fixing section of the optical pickup device of FIG. 20.
Figure 22:
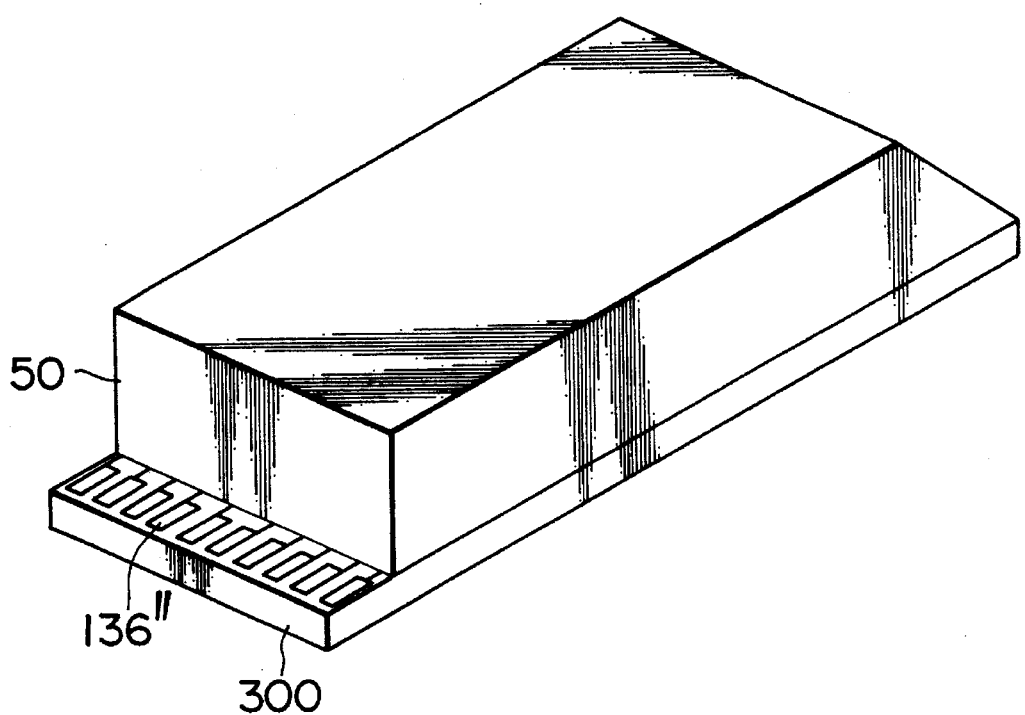
FIG. 22 is a perspective view of the fixing section of the optical pickup of FIG. 20.

Referring to FIGS. 20–22, an optical information storage medium control apparatus as a sixth embodiment of the present invention will be described. FIG. 20 is a schematic of an optical pickup device having an optical pickup device which is separated into a fixed unit PU1 and a movable unit PU2. In the present embodiment, the optical storage medium is an optical disk.

In FIG. 20, a cap 300 is fixed to a housing 50 of the fixed unit PU1 of the pickup device. Attached to the inner surface of the cap 300 is an integrated photodetector 2 and a collimating lens 7 similar to those mentioned above. A semiconductor laser 1 is fixed to a laser base 236 attached to the photodetector 2, and is driven by the system controller 70 connected through a flexible lead 68 to the photodetector 2.

A source light emitted from the laser 1 is irradiated on the photodetector 2, an irradiated light from which is reflected by a reflective mirror 6 fixed to the housing 50 to pass through the collimating lens 7 to become substantially parallel rays of light. The parallel rays of light then pass through a transparent window 201 to enter the movable unit PU2, where the parallel rays of light are reflected by the reflective mirror 202 in the movable unit PU2 and focused by the objective lens 3 to be irradiated on the disk 4. The signal rays of light reflected by the disk 4 return along a path similar to that along which the signal rays of light have propagated so far to be irradiated on the photodetector 2.

The integrated photodetector 2 has the same cross-sectional structure as that of FIG. 16 and is composed of a photosensor, planar waveguides and an incidence coupler integrated as a unit. It receives the source light and the signal light in a distinguished manner. An irradiated light intensity signal, read signal, focus error signal and track error signal are detected on the basis of the signal from the photodetector 2 in a manner similar to that mentioned above.

The objective lens 3 of the movable unit PU2 is supported by suspensions 63 so as to be movable in a direction normal to a recording surface of the disk 4 and radially of the disk.

The system controller 70 supplies an electric current to a finely moving electromagnetic coil 62 between magnetic circuit members 60 to form a magnetic circuit made of the coil 62 and the magnetic circuit members 60 in accordance with the focus error signal obtained from the signal output from the photodetector 2 to move the objective lens 3 in a direction normal to a recording surface of the disk 4 to provide focus control.

In response to the detected track error signal and an information access request received through an I/O bus from an external device (not shown), the system controller 70 supplies an electric current to a coarsely moving electromagnetic coil 71 to form a magnetic circuit formed between the coil 71 and magnetic circuit members 61 to move an outer housing 51, mounted on a linearly moving mechanism 53, radially of the disk 4. In addition, the system controller 70 supplies an electric current to a finely moving electromagnetic coil 62 to form a magnetic circuit formed between the coil 62 and magnetic circuit members 60 to move the objective lens 3 radially of the disk 4. As just described above, by moving the housing 51 and objective lens 3 of the movable unit PU2 to thereby provide track control for the disk 4.

The disk 4 is connected to the outer housing 51 by a connection mechanism (not shown) and impressed with a magnetic field by a biasing magnet 245 and a changeover coil 242 which move horizontally along with the housing 50 above the disk 4. Write and erasure of information under of control of the system controller 70 is the same as those described with respect to the third embodiment and further description thereof will be omitted.

FIG. 21 shows an illustrated structure of the cap 300, photodetector 2 and their vicinities of FIG. 20.

In FIG. 21, the cap 300 is attached to the semiconductor substrate 10 which is provided thereon with a planar optical waveguide 18, incidence diffraction grating 15 and other elements as in the embodiment of FIGS. 16–19. The outputs from the electrodes 246, 22 are supplied through a lead 125 to the bonding pads 136.

Attached to the semiconductor substrate 10 is a laser base 236' with a tilted surface on which a semiconductor laser 1 is attached. When the laser base 236' is made of a single crystal material such as silicon, the tilted surface of the laser base 236' is formed by anisotropic etching along its crystal face. When the laser base 236' is made of a regular material which excludes a single crystal, the tilted surface of the laser base 236' is formed by pressing or cutting.

An appropriate thin plate (not shown) is inserted as required between the laser base 236' and the semiconductor laser 1 to alleviate a difference in coefficient of thermal expansion between the laser base 236' and the laser 1. For convenience of production, the laser base 236' may be directly attached to the cap 300 and not on the semiconductor base 10.

Bonding pads 136' and 136" and leads 125' are formed with thin films by photolithography on the cap 300. When the cap 300 is made of a conductive material such as aluminum, the surface of the cap 300 is oxidized to form an insulator layer thereon, and the bonding pads 136', 136" and the leads 136" are then formed.

The bonding pads 136 and 136' on the semiconductor base 10 and the cap 300, respectively, are connected by pieces of wire 66. The semiconductor laser 1 and the bonding pad 136 are similarly connected by a piece of wire 66. The respective bonging pads 136" are connected by pieces of wire to the system controller 70 of FIG. 20.

The semiconductor substrate 10 and the cap 300 have position marks 310, 311 indicative of positions where the laser base and the semiconductor substrate 10, respectively, are attached. Those marks 310, 311 are provided simultaneously with the formation of the bonding pads and leads. By adjusting the respective positions of the elements concerned to the marks, attachment of the respective elements is made accurately and rapidly. By provision of the position marks at a position of attachment of the semiconductor laser on the laser base 236', attachment of the semiconductor laser to the laser base is made accurately and rapidly.

The cap 300 has a lens attaching hole 302 in which the collimating lens 7 of FIG. 20 is attached.

FIG. 22 shows a housing 50 attached to the cap 300 so as to cover the collimating lens 7 (not shown) attached to the cap 300 of FIG. 21 to thereby maintain airtight the inside of the housing 50 surrounded by the cap 300, housing 50 and collimating lens 7 with an inert gas enclosed within the housing 50 to maintain the stabilized operation of the laser 1.

That portion of the cap 300 where the bonding pads 136" are formed is exposed externally without being covered with the housing 50. The bonding pads 136" and the system controller 70 of FIG. 20 are connected by flexible leads, for example, on a flexible printed board (not shown).

In the optical disk device using the separate-type optical pickup device described with respect to FIGS. 20–22, use of the collimating lens 7 and reflective mirror 6 on the side of the fixed unit PU1 serves to constitute a lightweight movable unit PU2 composed of the reflective mirror 202 and the objective lens 3 alone to thereby increase the access speed and reduce the power consumption.

An example of attaching a semiconductor laser 1 to the semiconductor substrate 10 on which the integrated photodetector 2 of FIG. 11 described above is formed will be described illustratively with respect to FIG. 23.

The semiconductor substrate 10 is already attached to the cap 300. Formed on the semiconductor substrate 10, as shown in FIG. 11, is the integrated photodetector 2 composed of the upper and lower planar optical waveguides 204, 203 and the lower and upper incidence diffraction gratings 210, 211. The laser base 236" is attached to the semiconductor substrate 10.

The laser base 236" has a tilted surface 330 on which the semiconductor laser 1 is attached. When the base 236" is made of a single crystal such as silicon, the tilted surface 330 is formed by anisotropic etching along a face of its single crystal of the base. When the base 236" is made of a regular material and not of a single crystal, the tilted surface 330 is formed by cutting or pressing.

The cap 300 has a lens attaching hole 302 in which the objective lens 3 described in FIG. 16 or the collimating lens 7 described in FIG. 20 is attached. While in FIG. 23 the pins 65 and pieces of wire 66 shown in FIGS. 16–19 are used to connect the semiconductor laser 1 and the semiconductor substrate 10 to an external device, pieces of wire and bonding pads formed on the cap 300 may be used, as shown in FIGS. 20–22.

When the semiconductor substrate 10 is used for the laser base 236", and a photosensor is provided for detection of the intensity of a backward source light from the laser 1 as in the previous embodiments, a P-layer 270 is required to be formed on the laser base 236". To connect the P-layer 270 and the pin 65' with a piece of wire 66 easily, a surface parallel to the surface of the P-layer 270 is required to be formed beforehand on the pin 65' by cutting or pressing, as shown. In order to easily connect the piece of wire 66 to the pin 65", a surface parallel to that surface of the semiconductor laser 1 to which the piece of wire 66 is to be connected is required to be provided beforehand on the pin 65" by cutting or pressing.

Figure 23:
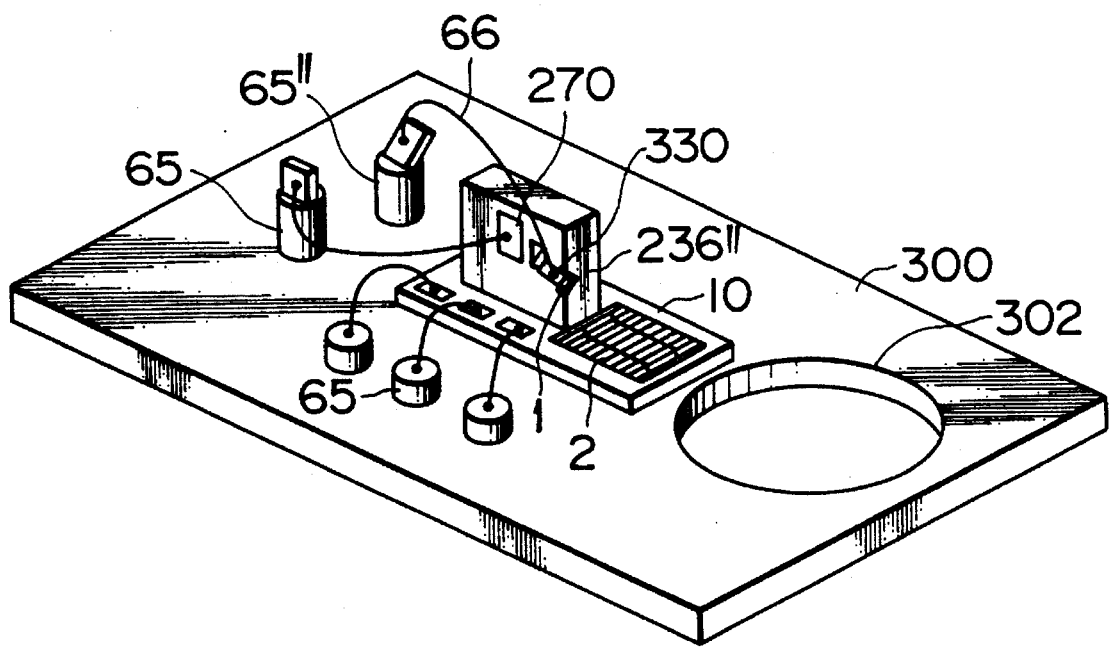
FIG. 23 is a perspective view of another example of the structure of the fixing section of the optical pickup of FIG. 20.

When the laser base 236" described in FIG. 23 is used, the direction of polarization of the source light from the semiconductor laser 1 may be selected to be in or not normal to a plane (hereinafter referred to as a plane of incidence) defined by the optical axis of the source light and a normal to the planar optical waveguide. This allows a ratio of a guided quantity of the signal light detected by the upper planar optical waveguide 204 to a guided quantity of the signal light detected by the lower planar optical waveguide 203 to be selected at an appropriate value to thereby increase the sensitivity of detection of the optical signal.

While in the embodiments of FIGS. 16–23 described above the semiconductor substrate 10 is shown as being attached to the cap 300, the substrate 10 and the cap 300 may be formed as a unit by forming the cap 300 with the substrate 10 to form on the substrate elements such as those formed on the substrate 10 described with respect to FIGS. 16–23.

For example, in the case of the fifth embodiment of FIG. 16, the cap 300 is made of the semiconductor substrate 10, all the elements of the photodetector 2 are formed as a unit in the cap 300 and the laser base 236 is directly attached to the cap 300 made of the semiconductor substrate 10. In order to extend the electrodes from the device formed as a unit, as thus described, a method of providing pins 65 on the cap 300, as shown in FIG. 18 or a method of extending the electrodes to the outside using thin film leads of FIG. 22 may be used. In FIG. 21, the formation of the cap 300 and the semiconductor base 10 as a unit dispenses with the connection of the film leads with pieces of wire 66 to thereby simplify the fabrication of the device generally.

While in FIG. 23 the method of extending the leads externally using the pins 65, 65' and 65" has been illustrated, a magneto-optic signal may be detected with an optical pickup having a simple structure by using thin film leads such as shown in FIG. 21.

When the semiconductor substrate 10 and the cap 300 are formed as one unit, the lens attaching hole 302 may be provided directly by etching or cutting or in any other conventional manner in the cap 300 which is the semiconductor substrate 10. When a photosensor and thin film leads are formed by photolithography on the cap 300, the positions of the lens attaching hole 302 and the laser base 236 may be marked simultaneously, formation of the hole 302 and setting the laser base 236 are made while the hole 302 and the base 236 are being positioned to the marks to thereby reduce the time taken for such formation and setting and hold high processing accuracy.

The angle of the plane of polarization of the source light in the incidence coupler of the photodetector 2 to the plane of incidence of the source light is formed at an angle in a range of 5–85 degrees in the first-sixth embodiments of the optical information storage control apparatus of the present invention as described above.

What is claimed is:

1. An optical information storage medium control apparatus comprising:

an optical information storage medium;

a storage medium driver provided on a frame for driving the medium;

an optical pickup device including a laser source for emitting linearly polarized light; an objective lens for focusing source light emitted from said laser source on the medium; a photodetector receiving signal light reflected from the medium, for converting the signal light into an electric signal, said photodetector including at least a photosensor, a planar optical waveguide formed on said photosensor for propagating the signal light therethrough, a diffraction grating for diffracting the signal light propagating through said waveguide, and an incidence coupler provided on said waveguide, for reflecting the source light from said laser source and receiving the signal light obtained through said objective lens from the medium; wherein said laser source and said photodetector are arranged such that an angle between an incidence plane of the source light to a surface of said planar optical waveguide and a polarization plane of the source light determined by both an optical axis and an electric field vector of the source light is in a range of 5 to 85 degrees;

an optical pickup driver for moving said optical pickup device so as to move the source light focused on the medium through the objective lens in a direction transverse to tracks of the medium; and a controller for controlling respective operations of said storage medium driver, optical pickup driver and pickup device.

2. An optical information storage medium control apparatus according to claim 1, wherein said photodetector includes: on said photosensor, a first planar optical waveguide for propagating therethrough a waveguided light having a TE (Transverse Electric) mode obtained by diffracting the signal light with said diffraction grating; and a second planar optical waveguide for propagating therethrough a waveguide light having a TM (Transverse Magnetic) mode obtained by diffracting the signal light with said diffraction grating.

3. An optical information storage medium control apparatus according to claim 2, wherein said photodetector includes a buffer layer smaller in refractive index than said first and second planar optical waveguides between said photosensor and said first and second planar optical waveguides.

4. An optical information storage medium control apparatus according to claim 3, wherein said photodetector includes:

a first diffraction grating corresponding to said first planar optical waveguide for diffracting the source light from said laser source;

a second diffraction grating corresponding to said second planar optical waveguide for diffracting the source light from said laser source; and a guided light absorbing layer for dodging the source light entered to said first and second planar optical waveguides.

5. An optical information storage medium control apparatus according to claim 3, wherein said laser source and said photodetector of said optical pickup device are disposed on an attaching base within an inner housing;

said laser source includes a semiconductor laser bonded in a recess formed by anisotropic etching in a part of a single crystal substrate;

said photodetector is formed tilted such that the source light emitted from said semiconductor laser is radiated on the semiconductor single crystal substrate;

a bonding pad is formed in a recess on said crystal substrate and connected electrically to said photodetector;

the bottom surface of the recess is parallel to a surface of said attaching base;

terminals are disposed on said attaching base for feeding a signal to said semiconductor laser and receiving a signal extracted from said photodetector; and said terminals have upper end surfaces parallel to a surface of said bonding pad.

6. An optical information storage medium control apparatus according to claim 3, wherein said photodetector includes;

a plurality of photodetectors connected with each other in a longitudinal direction, each photodetector includes, on a photosensor, a first diffraction grating corresponding to said first planar optical waveguide, for diffracting the source light emitted from said laser source and a second diffraction grating corresponding to said second planar optical waveguide, for diffracting the source light emitted from said laser source; and a guided light absorbing layer for dodging the source light entered to said first and second planar optical waveguides.

7. An optical information storage medium control apparatus according to claim 6, wherein said laser source and said plurality of photodetectors of said optical pickup device are disposed on an attaching base within a housing; said laser source includes a semiconductor laser bonded in a recess formed by anisotropic etching in a part of a single crystal substrate; said plurality of photodetectors are formed tilted on the semiconductor single crystal substrate so as to receive the source light emitted from said semiconductor laser; bonding pads are formed in a recess on said semiconductor single crystal substrate connected electrically on said semiconductor single crystal substrate such that signals from said plurality of photodetectors are united; the bottom surface of the recess is parallel to a surface of said attaching base; and a plurality of terminals are disposed on said attaching base for feeding a signal to said semiconductor laser and receiving signals extracted from said photodetectors, said terminals have at least upper end surfaces parallel to surfaces of said bonding pads.

8. An optical information storage medium control apparatus according to claim 1, wherein said optical pickup device includes a reflective mirror disposed between said incidence coupler of said photodetector and said objective lens in the optical paths of the source light and the signal light.

9. An optical information storage medium control apparatus according to claim 8, wherein said optical pickup device includes: a reflective mirror disposed between said incidence coupler of said photodetector and said objective lens in the optical paths of the source light and the signal light; and a collimating lens disposed in the optical path between said objective lens and said reflective mirror.

10. An optical information storage medium control apparatus according to claim 9, wherein said optical pickup device includes said photodetector arranged on substantially the same plane with the said objective lens in a housing.

11. An optical information storage medium control apparatus according to claim 9, wherein said optical pickup device includes a housing in which an objective lens focuses the source light emitted from said laser source on said medium;

said objective lens is fixed into a magneto-electric coil supported by a suspension member connected to an inner side of said housing whereby said magnetoelectric coil by supplying an electric current moves said objective lens away from and toward said medium and in a direction transverse to tracks of said medium; and a biasing coil for generating a magnetic field in radiating the source light on said medium is disposed on a position extended from said housing and opposited to said objective lens through said medium.

12. An optical information storage medium control apparatus according to claim 11, wherein said optical pickup device includes a sleeve enclosing said laser source and said photodetector disposed within said housing, said sleeve being covered with a transparent member transparent to the source light and the signal light in an airtight manner.

13. An optical information storage medium control apparatus according to claim 1, wherein said optical pickup device includes: in an inner housing, a laser source for emitting linearly polarized light, an objective lens for focusing the source light emitted from said laser source onto said medium, and a photodetector receiving the signal light reflected from the medium, for converting the signal light into an electric signal;

an outer housing including said inner housing having said laser source, objective lens and photodetector; and a magnetoelectric coil fixed to said inner housing and a magnetic circuit member fixed to said outer housing cooperating to support said inner housing such that an electric current supplied to said magnetoelectric coil forms a magnetic circuit to thereby move said optical pickup device disposed within said inner housing away from and toward the medium and in a direction transverse to tracks of the medium.

14. An optical information storage medium control apparatus according to claim 1, further comprising a biasing coil disposed on a position extending from said frame opposed to the medium through said objective lens.

15. An optical information storage medium control apparatus according to claim 1, wherein said optical pickup device includes:

a cap provided on a vertical wall of said frame and including said laser source, a photodetector for reflecting the source light emitted from said laser source and for receiving the signal light reflected from said medium and converting the signal light into an electric signal, a first reflective mirror for reflecting the source light and the signal light, and a collimating lens disposed in an opening in the cap and facing to an opening of the vertical wall of the frame;

a transparent member transparent to the source light and signal light and disposed on a housing opposed to said collimating lens;

a second reflective mirror disposed within said housing, for reflecting the source light and the signal light;

and an objective lens disposed on said housing so as to focus the source light onto the medium and to receive the signal light from the medium.

16. An optical information storage medium control apparatus according to claim 1, wherein said optical pickup driver includes an electromagnetic coil fixed into said optical pickup device, and a magnetic circuit member fixed to said frame so as to form a magnetic circuit by supplying an electric current to said electromagnetic coil.

17. An optical information storage medium control apparatus according to claim 1, wherein said optical pickup driver includes an electric motor, a worm gear provided on a rotating shaft of said motor, and a rack-pinion mechanism coupled from said worm gear to said optical pickup device.

18. An optical information storage medium control apparatus according to claim 1, further comprising, means for removably attaching the medium to said storage medium driver.

19. An optical information storage medium control apparatus according to claim 1, wherein said medium includes a magneto-optical medium.

20. An optical information storage medium control apparatus according to claim 1, wherein said medium includes an optical disk.

21. An optical information storage medium control apparatus comprising:

an optical information storage medium;

a storage medium driver provided on a frame for driving the medium;

an optical pickup device including a laser source for emitting linearly polarized light; an objective lens for focusing source light emitted from said laser source on the medium; a photodetector including at least a photosensor, a first planar optical waveguide formed on said photosensor for propagating therethrough a waveguided light having a TE (Transverse Electric) mode, a second planar waveguide formed on said photosensor for propagating therethrough a waveguided light having TM (Transverse Magnetic) mode, a first incident coupler provided on said first planar optical waveguide for converting a TE component of signal light obtained through said objective lens into the waveguided light having a TE mode guided by said first planar optical waveguide and reflecting the source light from said laser source, a second incident coupler provided on said second planar optical waveguide for converting a TM component of the signal light into the waveguided light having a TM mode guided by said second planar optical waveguide and reflecting the source light from said laser source, a first diffraction grating provided on said first planar optical waveguide for diffracting the waveguided light guided by said first planar optical waveguide, a second diffraction grating provided on said second planar optical waveguide for diffracting the waveguided light guided by said second planar optical waveguide, a buffer layer smaller in refractive index then said first and second planar optical waveguides between said photosensor and said first and second planar optical waveguides and a guided wave absorbing layer for dodging waveguided light guided by said first and second planar optical waveguide converted from the source light by said first and second incidence couplers; wherein said laser source and said photodetector are arranged such that an angle between an incidence plane of the source light with respect to a surface of said first or second planar optical waveguide and a polarization plane of the source light determined by both an optical axis and an electric field vector of the source light is in a range of 5 to 85 degrees;

an optical pickup driver for moving said optical pickup device so as to move the source light focused on the medium through the objective lens in a direction transverse to tracks of the medium; and a controller for controlling respective operations of said storage medium driver, optical pickup driver and pickup device.

22. An optical information storage medium control apparatus comprising:

an optical information storage medium;

a storage medium driver provided on a frame for driving the medium;

an optical pickup device including a semiconductor laser bonded in a recess formed by anisotropic etching in a part of a single crystal substrate, for emitting linearly polarized light; an objective lens for focusing source light emitted from said laser source on the medium; a photodetector formed tilted such that the source light emitted from said semiconductor laser is radiated on the semiconductor single crystal substrate and receiving signal light reflected from the medium, for converting the signal light into an electric signal, said photodetector including at least a photosensor, a planar optical waveguide formed on said photosensor for propagating the signal light therethrough wherein said semiconductor laser and said photodetector of said optical pickup device are disposed on an attaching base within an inner housing, a diffraction grating for diffracting the signal light propagating through said waveguide, and an incidence coupler provided on said waveguide, for reflecting the source light from said semiconductor laser and receiving the signal light obtained through said objective lens from the medium; wherein said laser source and said photodetector are arranged such that an angle between an incidence plane of the source light with respect to a surface of said planar optical waveguide and a polarization plane of the source light determined by both an optical axis and an electric field vector of the source light is in a range of 5 to 85 degrees;

an optical pickup driver for moving said optical pickup device so as to move the source light focused on the medium through the objective lens in a direction transverse to tracks of the medium;

a controller for controlling respective operations of said storage medium driver, optical pickup driver and pickup device;

a bonding pad formed in a recess on said crystal substrate and connected electrically to said photodetector, a bottom surface of the recess is parallel to a surface of said attaching base; and terminals disposed on said attaching base for feeding a signal to said semiconductor laser and receiving a signal extracted from said photodetector, said terminals have upper end surfaces parallel to surface of said bonding pad.

23. An optical information storage medium control apparatus according to claim 22, wherein said bonding pad includes a thin film lead formed on said semi-conductor single crystal substrate.

24. An optical information storage medium control apparatus comprising:

an optical information storage medium;

a storage medium driver provided on a frame for driving the medium;

an optical pickup device including a laser source for emitting linearly polarized light; an objective lens for focusing source light emitted from said laser source on the medium; a photodetector receiving signal light reflected from the medium, for converting the signal light into an electric signal, said photodetector including at least a photosensor, a planar optical waveguide formed on said photosensor for propagating the signal light therethrough, a diffraction grating for diffracting the signal light propagating through said waveguide, and an incidence coupler provided on said waveguide for reflecting the source light from said laser source and receiving the signal light obtained through said objective lens from the medium; wherein said laser source and said photodetector are arranged such that an angle between an incidence plane of the source light with respect to a surface of said planar optical waveguide and a polarization plane of the source light determined by both an optical axis and an electric field vector of the source light is in a range of 5 to 85 degrees;

an optical pickup driver for moving said optical pickup device so as to move the source light focused on the medium through the objective lens in a direction transverse to tracks of the medium;

a controller for controlling respective operations of said storage medium driver, optical pickup driver and pickup device; and a biasing coil disposed on a position extending from said frame opposite to the medium through said objective lens.

25. An optical information storage medium control apparatus according to claim 24, wherein said biasing coil includes a biasing magnet, and a changeover coil for selectively switching the angle of said biasing magnet so as to generate a magnetic field in an optimal state on that portion of the medium which receives the source light.

26. An optical information storage medium control apparatus according to claim 24, wherein said biasing coil includes a plurality of biasing coils, one of which is selectively operated so as to generate a magnetic field in an optimal state on that portion of the medium which receives the source light.

27. An optical information storage medium control apparatus comprising:

an optical information storage medium;

a storage medium driver provided on a frame for driving the medium;

an optical pickup device including a laser source for emitting linearly polarized light; an objective lens for focusing source light emitted from said laser source on the medium; a photodetector including at least a photosensor, a first planar optical waveguide formed on said photosensor for propagating therethrough a waveguided light having a TE (Transverse Electric) mode, a second planar waveguide formed on said photosensor for propagating therethrough a waveguided light having TM (Transverse Magnetic) mode, a first incident coupler provided on said first planar optical waveguide for converting a TE component of signal light obtained through said objective lens into the waveguided light having a TE mode guided by said first planar optical waveguide and reflecting the source light from said laser source, a second incident coupler provided on said second planar optical waveguide for converting a TM component of the signal light into the waveguided light having a TM mode guided by said second planar optical waveguide and reflecting the source light from said laser source, a first diffraction grating provided on said first planar optical waveguide for diffracting the waveguided light guided by said first planar optical waveguide, a second diffraction grating provided on said second planar optical waveguide for diffracting the waveguided light guided by said second planar optical waveguide, a buffer layer smaller in refractive index than said first and second planar optical waveguides between said photosensor and said first and second planar optical waveguides; wherein said laser source and said photodetector are arranged such that an angle between an incidence plane of the source light with respect to a surface of said first or second planar optical waveguide and a polarization plane of the source light determined by both an optical axis and an electric field vector of the source light is in a range of 5 to 85 degrees;

an optical pickup driver for moving said optical pickup device so as to move the source light focused on the medium through the objective lens in a direction transverse to tracks of the medium; and a controller for controlling respective operations of said storage medium driver, optical pickup driver and pickup device.

* * * * *